United States Patent
Suzuki et al.

[11] Patent Number: 5,860,719
[45] Date of Patent: Jan. 19, 1999

[54] OPTICAL APPARATUS AND COOLING METHOD THEREOF

[75] Inventors: Toshihiro Suzuki; Noriyuki Ohasi, both of Kawasaki; Tsutomu Nagakari, Kagoshima; Tetsuya Hamada, Kawasaki; Hisashi Yamaguchi, Kawasaki; Masaru Ishiwa, Kawasaki, all of Japan

[73] Assignee: Fujitsu Limited, Kawasaki, Japan

[21] Appl. No.: 454,631

[22] Filed: May 31, 1995

[30] Foreign Application Priority Data

Jul. 8, 1994 [JP] Japan .................................. 6-157401
Jul. 8, 1994 [JP] Japan .................................. 6-157533

[51] Int. Cl.$^6$ .................................................. G03B 21/16
[52] U.S. Cl. .............................. 353/61; 353/60; 353/52; 362/294
[58] Field of Search .................................. 353/52, 57, 58, 353/60, 61, 119; 362/345, 295, 294; 165/80.1, 80.3

[56] References Cited

U.S. PATENT DOCUMENTS

| | | | |
|---|---|---|---|
| 3,642,361 | 2/1972 | Streu | 353/57 |
| 4,787,737 | 11/1988 | Ogawa et al. | 353/57 |
| 4,925,295 | 5/1990 | Ogawa et al. | 353/57 |
| 5,287,132 | 2/1994 | Suzuki et al. | 353/57 |
| 5,418,586 | 5/1995 | Fujimori et al. | 353/58 |
| 5,626,416 | 5/1997 | Romano et al. | 362/294 |

FOREIGN PATENT DOCUMENTS

A553200  3/1993  Japan .
A580442  5/1993  Japan .

Primary Examiner—William Dowling
Attorney, Agent, or Firm—Greer, Burns & Crain, Ltd.

[57] ABSTRACT

A light source such as a metal halide lamp is effectively cooled in an optical apparatus such as a liquid crystal projector. In an optical apparatus which includes a concave mirror 11, a light emitting section 12 arranged in a concave portion of the concave mirror along the optical axis and a cooling structure for cooling a periphery of the light emitting section, the cooling structure is provided with a means for generating an air flow 4, the direction of which is approximately perpendicular to the optical axis of the concave mirror 11, and a means for generating an air flow 5 circulating into the concave portion of the concave mirror 11.

28 Claims, 32 Drawing Sheets

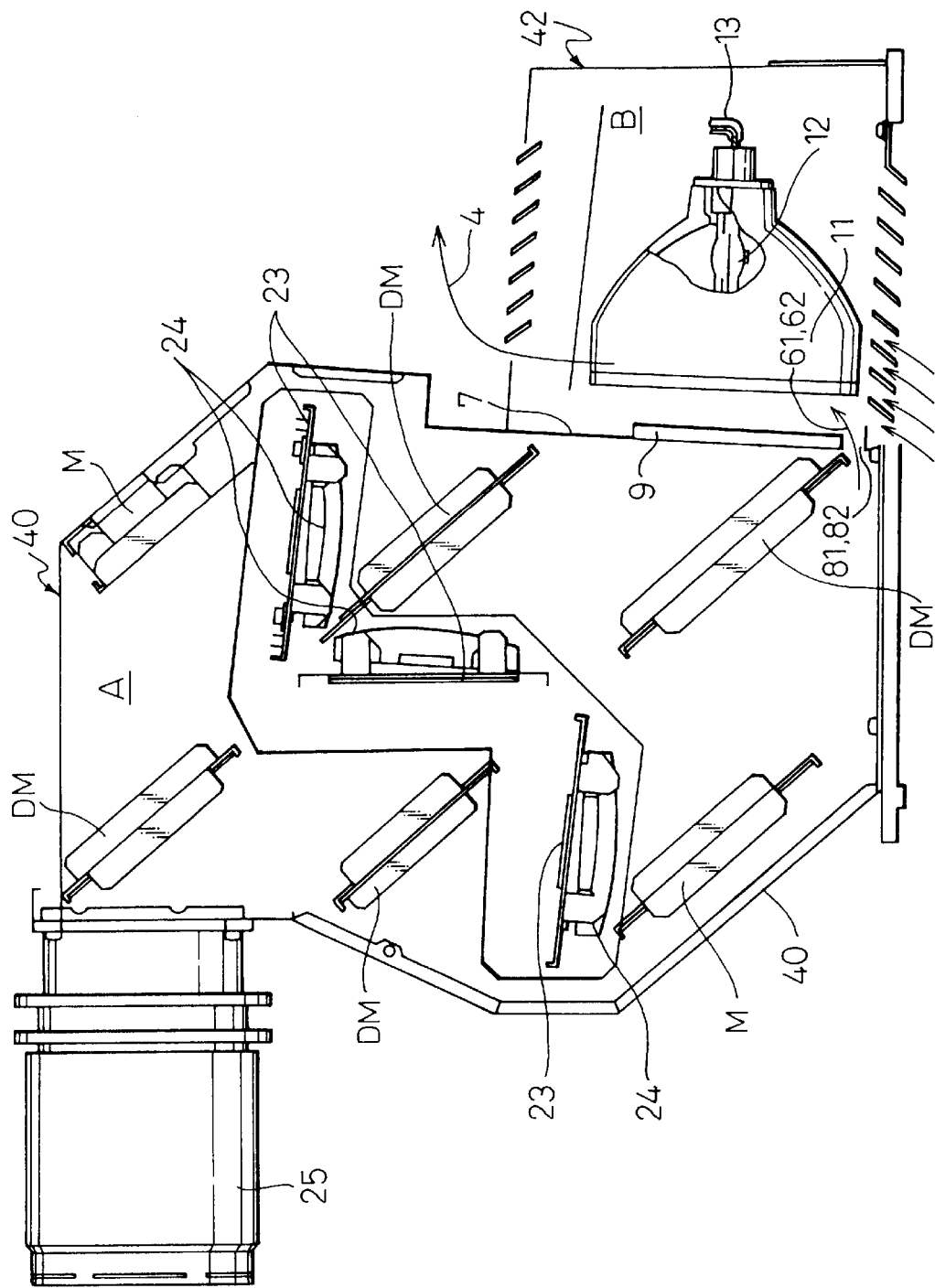

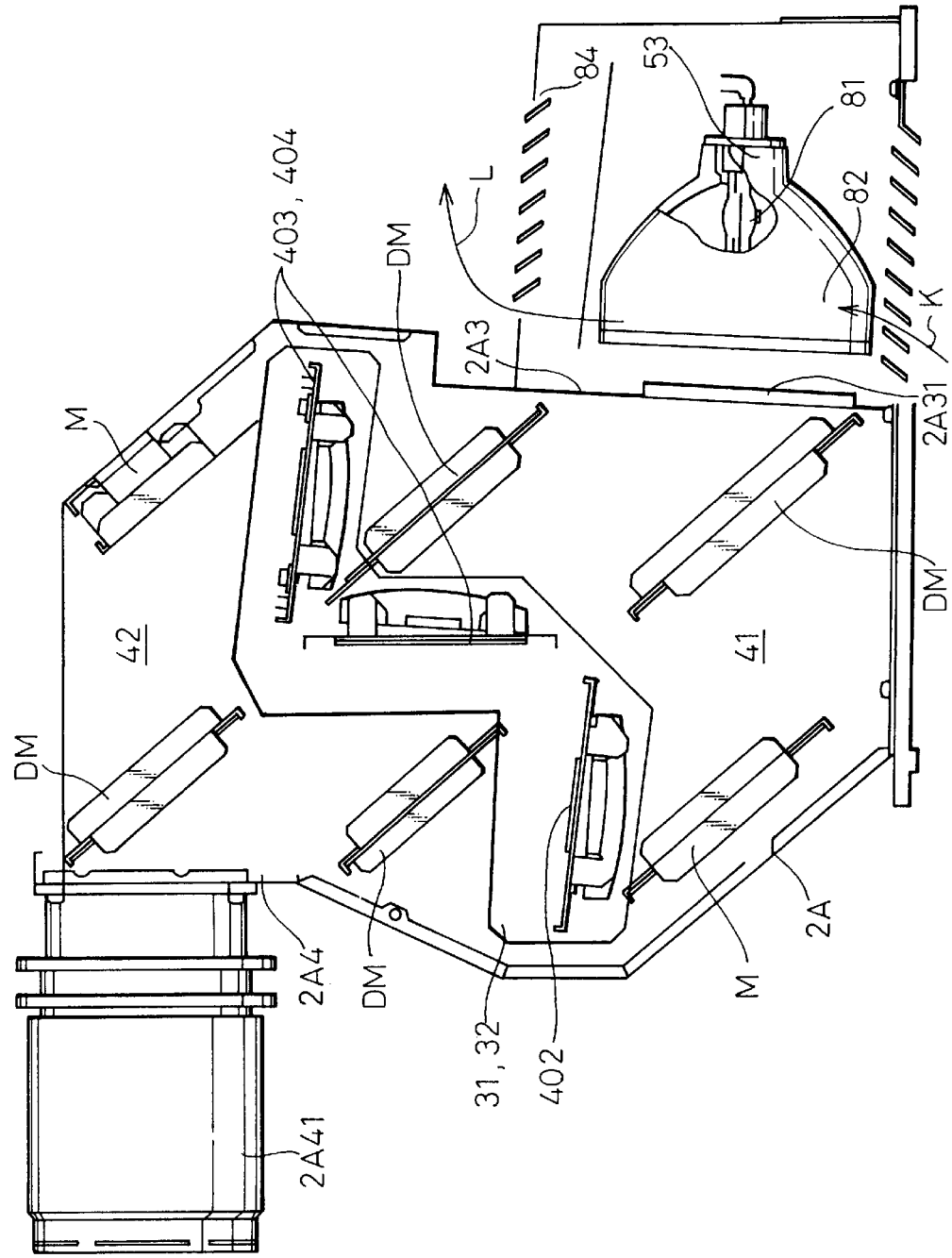

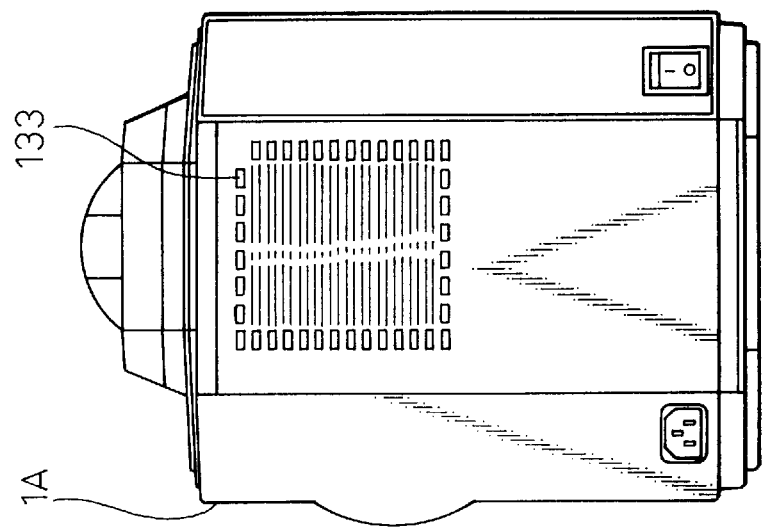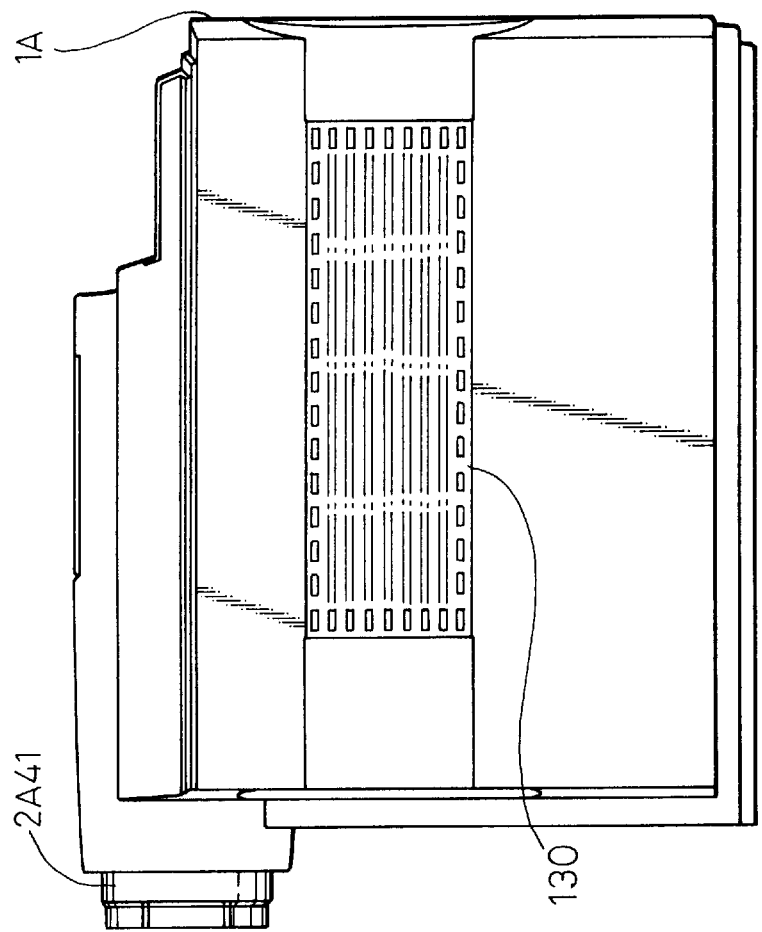

OPTICAL APPARATUS AND COOLING METHOD THEREOF

BACKGROUND OF THE INVENTION

1. Field of the Invention

The present invention relates to an optical apparatus such as a liquid crystal projector provided with a light emitting section having a concave mirror to be used as a light source and a cooling method thereof. Further, the present invention relates to an optical apparatus provided with a low temperature and high pressure region and a high temperature and low pressure region. Furthermore, the present invention relates to a cooling mechanism for cooling an optical apparatus, especially a liquid crystal projector provided with a high temperature region in which a large amount of heat is generated such as a discharge emission type light source of high output and also provided with a low temperature region which tends to be damaged by heat such as an electric circuit and a light bulb, wherein the high and low temperature regions are arranged substantially adjacent to each other in the apparatus.

2. Description of the Related Art

The liquid crystal projector magnifies an image displayed on a transmission type liquid crystal panel, the width across corners of which is several inches, by 10 to 100 times using an optical system, and the magnified image is projected on a screen. Therefore, a discharge emission type metal halide lamp with an input power of 150 to 200 W is used, from which light is emitted when a metal gas is subjected to an electric discharge. The metal halide lamp includes a light emitting section composed of a silica tube in which a light emitting material such as mercury or a rare earth metal is enclosed, and an electrode is used for discharge. The metal halide lamp is fixed to a concave mirror and assembled to an optical apparatus such as a liquid crystal projector.

The metal halide lamp is disadvantageous in that light emission of mercury gains predominance so that the light emitting efficiency is sharply lowered when the temperature of a silica tube in the light emitting section is not more than 800° C. approximately, and further the light emitting spectrum is suddenly changed, the luminance is lowered and white becomes unbalanced in the display. On the other hand, the following problems are also caused. Depending upon the electric power consumption of the light emitting section, when the temperature of the silica tube in the light emitting section is raised to more than 900° C. approximately, a reaction between the silica tube and light emitting material rapidly occurs, so that the composition of the light emitting material is changed and the spectrum is also changed, and as a result, the displayed colors are changed, and at the same time the silica tube becomes opaque, so that light is absorbed and scattered by the silica tube and the amount of light generation is substantially reduced. Further, the silica tube is expanded and deformed by the high inside pressure (15 to 20 atm), light is absorption by the opaque silica tube and a temperature rise is caused by heat generation. Therefore, it is impossible to use the metal halide lamp over a long period of time.

About 25% of electric power input into the metal halide lamp is converted into visible light, and about 15% of electric power is irradiated, as light, onto a liquid crystal panel, or a dichroic mirror arranged on the optical unit, to be irradiated.

About 10% of the electric power is converted into visible light and about 75% of the electric power that has not been converted into visible light, that is, about 85% of the total electric power is changed into heat in the lamp house.

The larger the amount of electric power input into the metal halide lamp, the higher the luminance of display. In proportion to the increase in the amount of electric power, the amount of generated heat is increased. Therefore, it is important to protect a low temperature region, in which an optical system is accommodated, from a heat flow which flows out from a lamp house in a high temperature region. Conventionally, in order to protect the low temperature region from the heat flow, the following countermeasures are taken: The low temperature region is separate from the high temperature region; a heat insulating plate is inserted between the low and high temperature regions; the amount of generated heat is restricted by using a metal halide lamp into which electric power of not more than 200 W is inputted; and the capacity of the cooling fan for cooling the low temperature region is greatly increased.

However, according to the method in which the low temperature region is separate from the high temperature region, it is necessary that both regions are separate from each other by not less than several tens of mm. Therefore, dimensions of the apparatus are increased, and further the distance to the liquid crystal panel arranged in the low temperature region is increased by several tens mm, so that an amount of light collected onto the liquid crystal panel is reduced, and the luminance of the display is lowered.

Glass fiber cloth or mica is used for a heat insulating plate inserted between the low and high temperature regions. However, the heat insulating plate made of glass fiber cloth or mica is disadvantageous in the dust is caused, the heat insulating plate is expensive and the structure is complicated.

According to the method in which the capacity of the low temperature region cooling fan is greatly increased, a high level of noise is produced, and further the electric power consumption of the apparatus is increased.

For example, in the case of a metal halide lamp, the electric power input of which is 250 W, temperatures of a housing and a steel sheet wall between an optical unit to be irradiated and a lamp house are raised to 100° to 200° C. Due to the heat which flows through the steel sheet wall into the optical unit to be irradiated, the temperature of a liquid crystal panel, especially the temperature of a portion of the liquid crystal panel close to the steel sheet wall is raised by about 10° C. The increase of temperature caused by a heat flow which flows from the lamp house through the steel sheet wall cannot be neglected in the case of a liquid crystal panel, the upper limit of normal operation temperature of which is only 60° C.

In order to solve the above problems, a metal halide lamp of low electric power (not more than 150 W), the silica tube of which is less susceptible to deformation of expansion even in the case of natural air cooling, is conventionally used so that the silica tube can be cooled by an air flow and a circulating current.

Alternatively, an air flow is introduced into the concave mirror from a lower cutout portion or a side cutout portion of the concave mirror so that the silica tube can be cooled, and a hot air flow is forcibly discharged outside from an upper cutout portion of the concave mirror.

In order to operate the liquid crystal panel in a normal condition, it is required that the temperature of the liquid crystal panel which is arranged in front of the light source at a position distant from the light source only by 100 to 250 mm is maintained at not more than 60° C. Also, it is required that the temperature of a polarized light film which is arranged on both sides of the liquid crystal panel for absorbing unnecessary light by converting it into heat is maintained to be not more than 60° C.

Further, a printed board to which an electric circuit for driving the liquid crystal panel is assembled must be arranged close to the liquid crystal panel, has an upper limit of allowable operation temperature of 60° C., and has an electric power consumption of not more than 10 W. In the case of a printed board onto which an electric power circuit is assembled for supplying DC power, the electric power consumption is about 30 W, however, the upper limit of allowable operation temperature is 60° C.

In the case of a printed board onto which an electric circuit for turning on a light source to send light to the pretreatment system is assembled, it is necessary that the printed board is arranged close to the light source of high temperature, and further the electric power consumption is about 50 W, however, the upper limit of allowable operation temperature is only 70° C.

In order to maintain the image quality, the positional relationship, the distance and direction of the optical system including the light source, the pretreatment system, the after-treatment system for the liquid crystal panel and projection lens, must be maintained in a predetermined condition. Accordingly, the degree of freedom of designing the optical system is very low with respect to the layout in the apparatus.

Consequently, it is important to effectively transport the heat generated by the optical system, the electric circuits and other members and discharge it outside of the apparatus so that the temperatures of all the members in the apparatus can be maintained appropriate for normal operation.

Conventionally, the outside air sucked through a suction port provided close to the liquid crystal panel is first blown against the liquid crystal panel. Next, the air is discharged outside of the apparatus through an exhaust port arranged close to the light source approximately straight. The printed board and light source are arranged approximately between the suction and exhaust ports, wherein the printed board is arranged upstream, and the light source is arranged in the downstream, in the air flow.

SUMMARY OF THE INVENTION

According to the investigation made by the present inventors, the following was discovered:

In a normal liquid crystal projector, the top and bottom of which are inverted when an apparatus, which is normally used on a table, is moved to a ceiling so as to be used under the condition that the apparatus is hung from the ceiling and, when a natural air cooling method is employed, an air current always flows from a lower position to an upper position with respect to gravity. Therefore, a cold circulating current comes directly into contact with and cools an upper portion of the silica tube where the amount of generated heat is largest. Accordingly, the temperature difference between the upper and lower portions of the silica tube is advantageously reduced.

However, the amount of the gas flow is so small that, for example, in a liquid crystal projector which contains a 250 W metal halide lamp, the temperature of the upper portion of the silica tube is raised to 1000° to 1100° C., and the luminance is reduced to half when the silica tube is lit for 500 to 100 hours. Accordingly, a 250 W metal halide lamp cannot be applied to the liquid crystal projector and, also, a metal halide lamp of high luminance, the electric power consumption of which is higher than 250 W, cannot be applied, either.

On the other hand, a forced air cooling method can provide a larger cooling effect than that of a natural air cooling method. However, when the top and bottom are inverted and the apparatus is hung from a ceiling, the circulating air current comes directly into contact with and cools a lower portion of the silica tube at which the amount of generated heat is smallest, and after the temperature of the air has been raised, the air current cools an upper portion of the silica tube at which the amount of generated heat is largest. Accordingly, a temperature difference between the upper and lower portions of the silica tube is increased to a value not less than 200° C., which causes problems.

The inventors then made another investigation. They investigated a method by which an air current is blown to the entire inside of the concave mirror. According to this method, the light emitting tube is sufficiently cooled, however, hot gas scatters in all directions. Therefore, temperatures of parts arranged outside of the space to be cooled, for example, temperatures of electric parts are raised to a value that cannot be allowed. Further, the outer shell mold resin such as acrylonitrile butadiene styrene resin, the softening temperature of which is 88° C., or polycarbonate resin, the softening temperature of which is 130° C., is subjected to thermal deformation.

Further, it is difficult to arrange a cooling structure in front of the concave mirror without blocking the light.

When a highly directional air flow is directed to the silica tube in the light emitting section, it is possible to cool the silica tube with a small amount of wind, and further the generated heat is not scattered. However, it is difficult to uniformly cool the entire silica tube, and the temperature distribution of the silica tube fluctuates in response to small changes in the amount or direction of the cooling air. Accordingly, the controllability is very low, and it is difficult to manufacture the apparatus.

Further, when the silica tube is excessively cooled, the inner light emitting member is cooled to an excessively low temperature, so that the amount of light emitted is sharply reduced, and further the light emitting spectrum is changed. Therefore, when this apparatus is applied to a liquid crystal projector, the image quality deteriorates.

BRIEF DESCRIPTION OF THE DRAWINGS

FIG. 19 is a sectional side view showing the specific example of the liquid crystal projector to which the present invention is applied;

FIG. 30 is a schematic illustration showing a specific example of the liquid crystal projector to which the examples shown in FIGS. 22 to 29 are applied;

FIGS. 32(a) and 32(b) are a side view and a back side view showing the appearance of the liquid crystal projector shown in FIG. 31;

DETAILED DESCRIPTION OF THE PREFERRED EMBODIMENT

Figure 1:
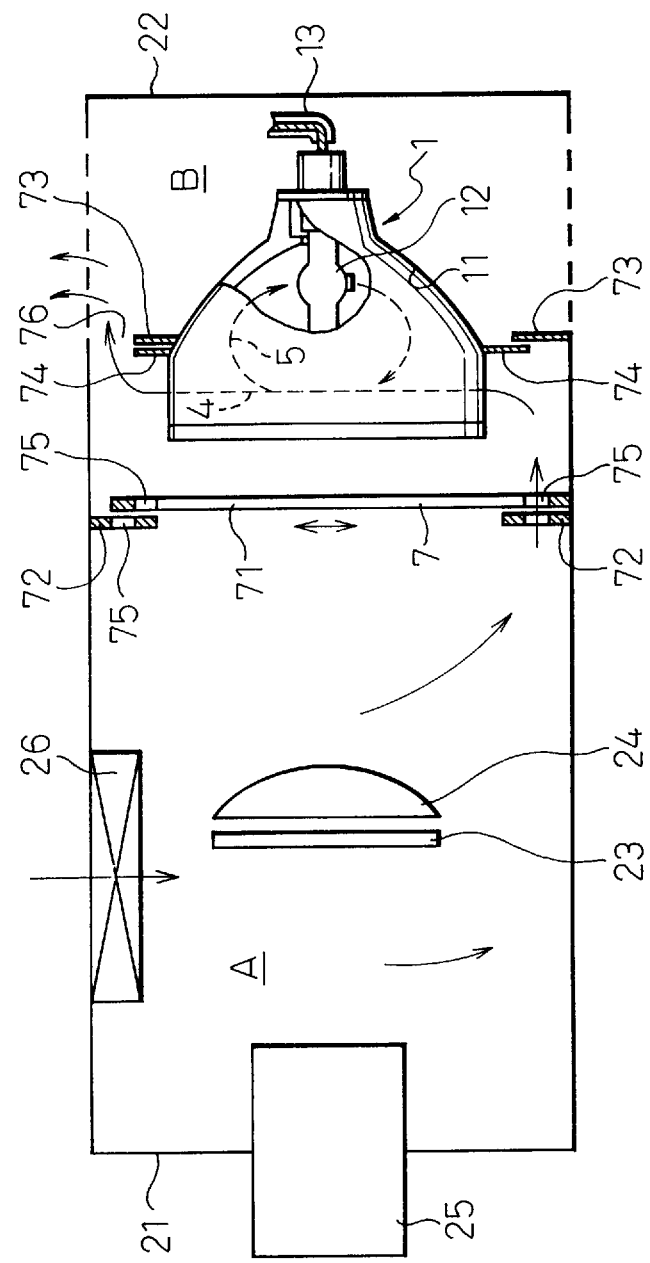
FIG. 1 is a view showing the liquid crystal projector of the first example of the present invention.

FIG. 1 is a schematic illustration of the liquid crystal projector of the first example of the present invention. The metal halide lamp 1, which is a light source, includes a concave mirror 11, a light emitting section 12 composed of a silica tube arranged on the inside of the concave mirror along the optical axis, and an electrode 13. The metal halide lamp 1 is accommodated in a lamp house 22 which becomes a high temperature and low pressure region B. On the other hand, in the optical unit 21 which becomes a low temperature and high pressure region A, there are provided a single liquid crystal panel 23, condenser lens 24, projection lens 25, and suction fan 26.

In this apparatus, light emitted by a light emitting section 12 is projected on a screen in the following manner: A portion of light emitted by the light emitting section 12 of the metal halide lamp 1 is reflected on the concave mirror 11 and passes through a transparent body arranged between the optical unit 21 and the lamp house 22. Then, the light is converged by the condenser lens 24 so that the light becomes a condensed beam into the projection lens 25. Then the condensed beam of light is irradiated onto the rear side of the liquid crystal panel 23 and magnified by the projection lens 25. The image to be displayed is projected on a screen (not shown).

By the rotation of the suction fan 26, an air current flows which is substantially parallel with the liquid crystal panel 23. After the air current has cooled the liquid crystal panel 23, it passes through a ventilation hole 75 formed at the lower end portion of a wall provided between the optical unit 21 and the lamp house 22. Then the air current flows into the lamp house 22. By the action of the air current that has flowed into the lamp house 22, an air current 4 substantially perpendicular to the optical axis of the concave mirror 11 is generated, and a portion of the air current 4 collides with an upper side of the concave mirror 11, and a circulating current 5, directed to the concave portion of the concave mirror 11, is formed.

In the first example shown in FIG. 1, between the light source and the condenser lens, that is, between the optical unit 21 and the lamp house 22, there are provided a movable wall 71 capable of moving upward and downward, and a fixed wall 72 provided at an upper and a lower position. At an upper and a lower position of the concave mirror 11, there are provided a movable wall 73 capable of moving upward and downward, and a fixed wall 74.

When the liquid crystal projector is inverted, the movable walls 71, 73 are moved downward by the action of gravity. Therefore, in accordance with the positional relation between the fixed wall 72 and the movable wall 71 contacted with each other, the ventilation hole 75 is always formed on the lower side where the fixed wall 72 and the movable wall 71 are combined. In accordance with the positional relation between the fixed wall 74 and the movable wall 73 contacted with each other, the ventilation hole 76 is always formed on the upper side of the concave mirror 11 where the fixed wall 74 and the movable wall 73 are combined, so that the ventilation hole on the lower side is closed.

As a result, even when the liquid crystal projector is located on the floor or hung on the ceiling, the air flow 4 of forced air cooling flows into the concave mirror from the lower side and discharges out from the upper side. Further, the circulating current 5 directly cools first the upper portion of the silica tube of the heat emitting section 12, where the amount of generated heat is largest.

In this example, the ventilation passage is mechanically changed using gravity, however, the ventilation passage may be electrically changed. Also, when a rotational direction of the fan is reversed, it is possible to reverse the ventilation passage. In the case where the ventilation passage or the rotational direction of the fan is changed, a switch may be used, the top and bottom of the display of which are inverted, or alternatively a predetermine external switch may be provided. In this case, the suction fan 26 is arranged on the floor side or the ceiling side. However, since the apparatus body is separated from the floor or the ceiling, no problems are caused in the suction of the outside air.

Figure 2:
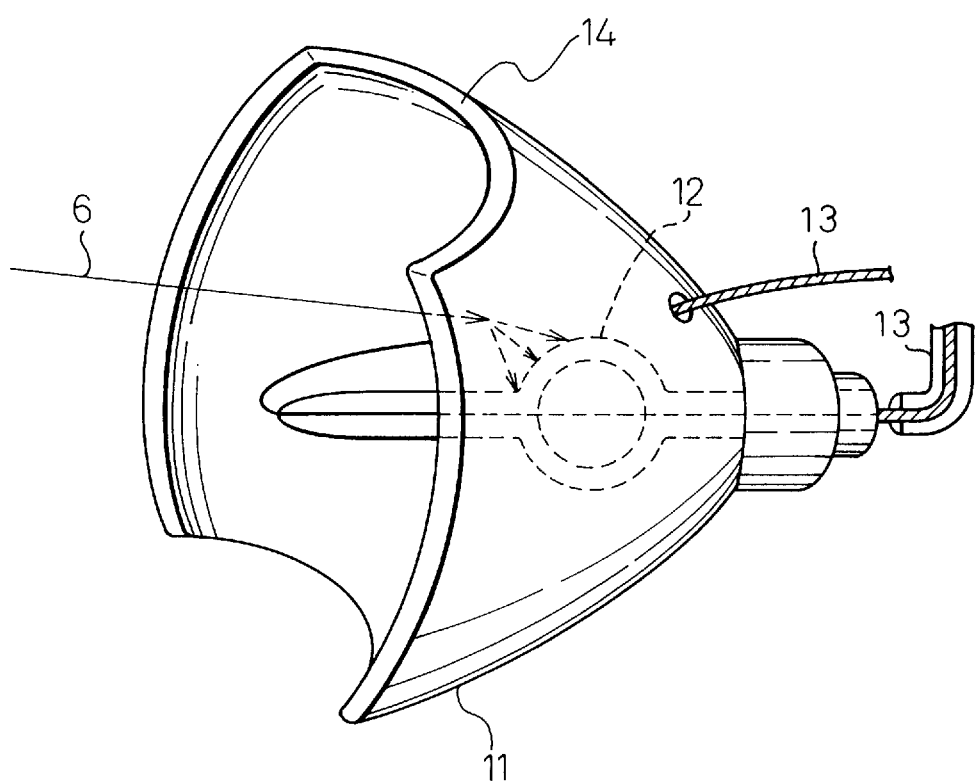
FIG. 2 is a view showing the light source of the second example of the present invention.

In FIG. 2, the second example of the present invention is shown. An air flow 6 is supplied from a ventilating duct (not shown in the drawing) arranged on the left of the concave mirror 11. The ventilating duct is adjusted in the following manner. The main portion of the air flow 6 evades the silica tube of the light emitting section 12 and collides with a portion of the concave mirror on the left with respect to the silica tube. The air flow 6 is a directional current. Therefore, a loss caused when the air flow 6 collides with the atmospheric gas is small, and the air flow 6 penetrates until it collides with the surface of the concave mirror 11. After the air flow 6 has collided with the surface of the concave mirror 11, while the air flow 6 is diffused, its speed is reduced, and the silica tube 12 is enclosed and cooled by the air flow 6. According to this example, the entire silica tube of the light emitting section 12 can be effectively and uniformly cooled. In this case, since the air flow 6 is forcibly generated and, further, ventilation is maintained on the horizontal surface including the light emitting section 12, the same cooling effect can be provided even if the apparatus is inverted. In this connection, numeral 14 is a cutout portion provided in the upper and lower portions of the concave mirror 11.

Figure 3A:
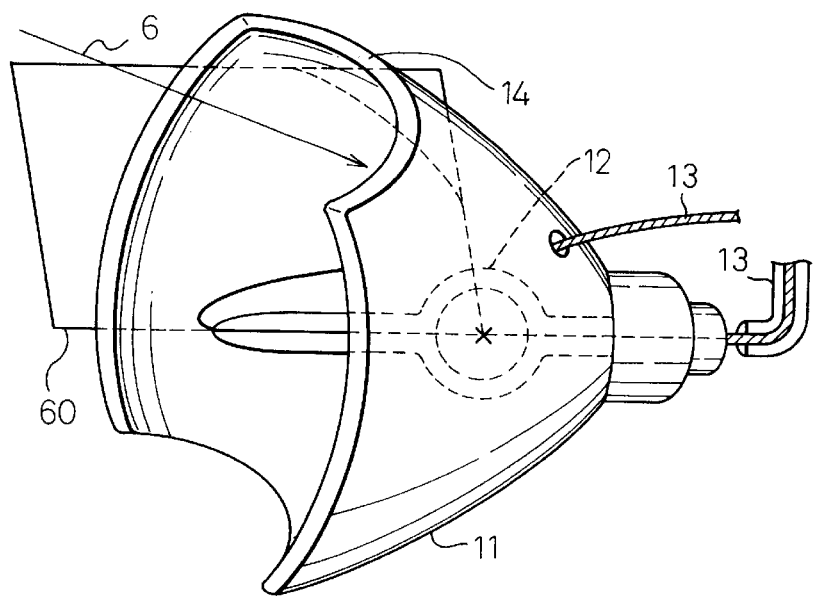
FIGS. 3(*a*), 3(*b*) and 3(*c*) are a perspective view, a side view, and a front view of the light source device of the third example of the present invention.
Figure 3B:
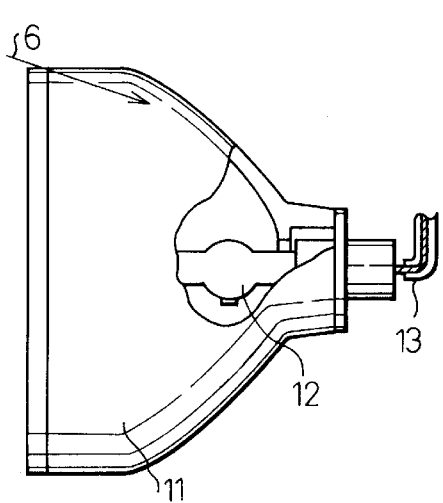
Figure 3C:
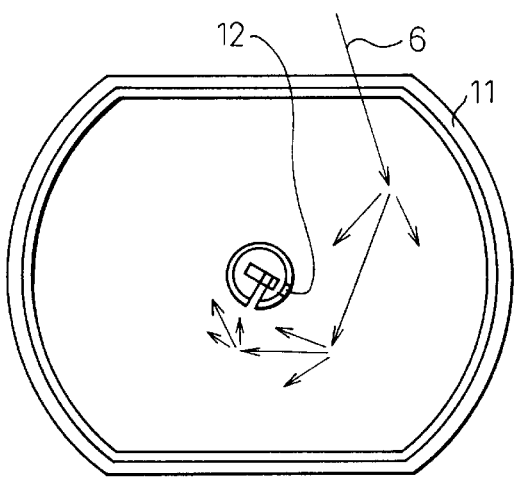

FIGS. 3(a) to 3(c) show the third example of the present invention. In this example, a ventilating duct for supplying the air flow 6 is arranged in such a manner that a main portion of the air flow 6 does not exist on a plane 60 including the optical axis of the concave mirror 11. In this case, the light emitting section 12 is located on the optical axis of the concave mirror 11. Accordingly, the air flow, which has collided with the concave mirror 11, is formed into a spiral air flow which winds around the optical axis of the concave mirror 11. Therefore, the spiral air flow covers the entire silica tube which is the light emitting section 12. Consequently, heat in the deepest portion of the concave mirror 11 can be effectively discharged by the air flow. According to this example, the entire silica tube can be uniformly cooled in both the rotational direction and the axial direction, and further the deepest portion of the concave mirror can be effectively cooled.

Figure 4A:
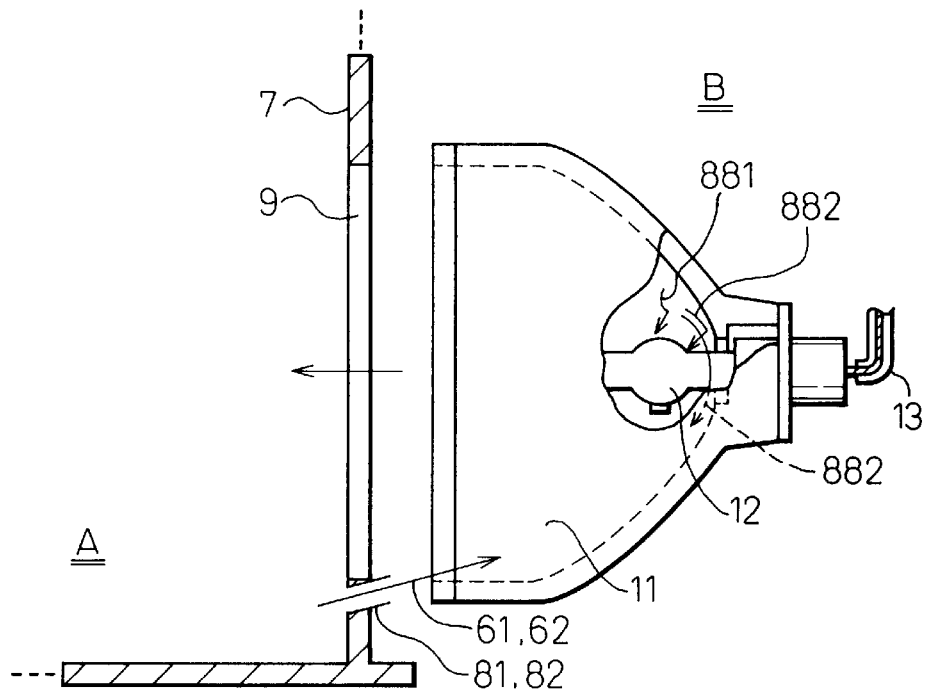
FIGS. 4(*a*) and 4(*b*) are a side view and a front view of the light source device of the fourth example of the present invention.
Figure 4B:
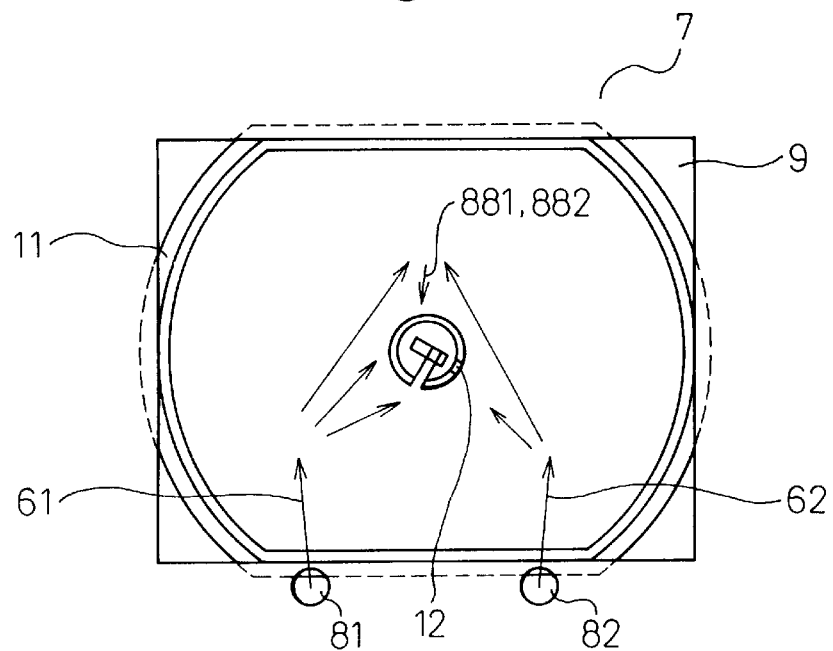

FIGS. 4(a) and 4(b) show the fourth example of the present invention. The apparatus is composed of a high temperature and low pressure region B in which the light source is arranged, and a low temperature and high pressure region A adjacent to the high temperature and low pressure region B. A transparent body 9 through which light emitted from the light source is transmitted is set in a portion of the wall 7 arranged between both regions A and B is such a manner that the transparent body 9 is opposed to the concave mirror 11. On the wall 7 adjacent to the transparent body 9, there are provided ventilating holes 81, 82 having the structure of a ventilating duct by which the directional air flows 61, 62 are generated in predetermined directions. Air flows 61, 62 respectively blow out from the ventilating holes 81, 82 and are adjusted so that the air flows 61, 62 rotate in the directions different from each other with respect to the optical axis of the concave mirror 11.

The right and left portions and the lower portion of the silica tube are cooled by the scattered air flow reflected from the inner wall of the concave mirror 11. On the other hand, the upper portion of the silica tube is cooled by the air flows 881 and 882, wherein the air flow 881 is generated in such a manner that the air flows 61, 62 reflect on the inner wall of the concave mirror 11 and then collide with each other and scatter, and the air flow 882 is generated in such a manner that the air flows 61, 62 collide with each other and reflect in the deepest portion of the concave mirror. In this way, the entire silica tube is uniformly cooled, and the generated heat in the deepest portion of the concave mirror can be effectively discharged outside. The air flows 61, 62 of this method are generated by forced air cooling. Therefore, the air flows 61, 62 are much stronger than the air flows generated by natural air cooling, and even if the apparatus is inverted, the cooling principle and efficiency are hardly changed.

Figure 5A:
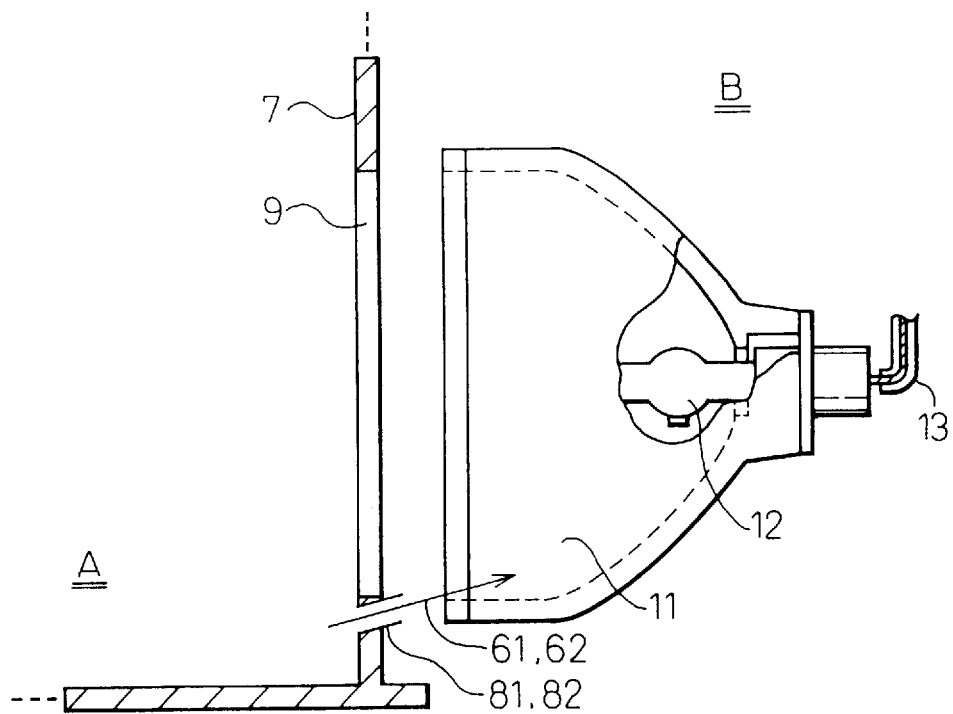
FIGS. 5(*a*) and 5(*b*) are a side view and a front view of the light source device of the fifth example of the present invention.
Figure 5B:
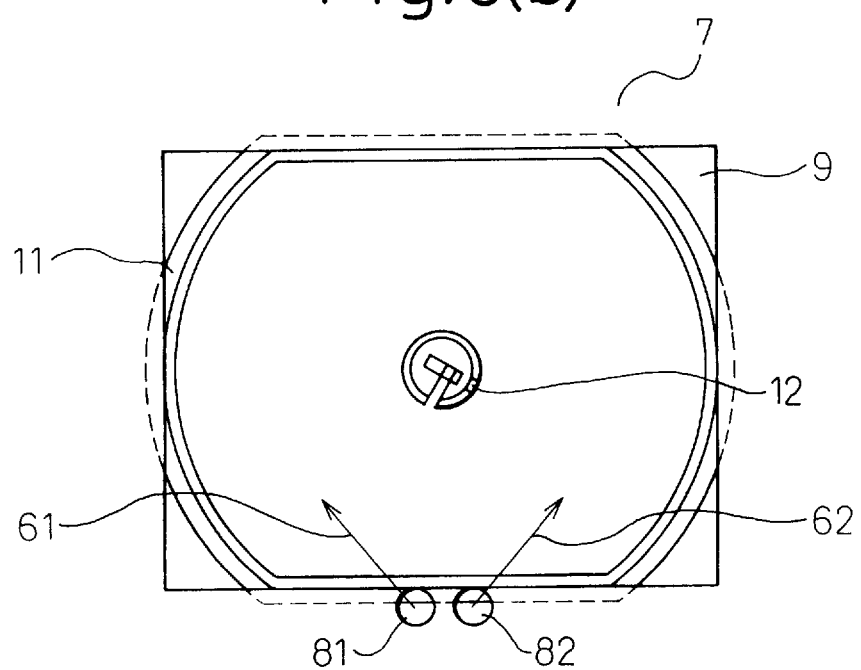

FIGS. 5(a) and 5(b) show the fifth example of the present invention. The apparatus is composed of a high temperature and low pressure region B in which the light source is arranged, and a low temperature and high pressure region A adjacent to the high temperature and low pressure region B. A transparent body 9, through which light emitted from the light source is transmitted, is set in a portion of the wall 7 arranged between both regions A and B in such a manner that the transparent body 9 is opposed to the concave mirror 11. On the wall 7 adjacent to the transparent body 9, there are provided ventilating holes 81, 82 having the structure of ventilating ducts by which the directional air flows 61, 62 are generated in predetermined directions. The new points in the fifth example compared to the fourth example are described as follows: The ventilating holes 81, 82 are adjacent to each other. The air flows 61, 62 respectively blowing out from the ventilating holes 81, 82 are adjusted in such a manner that the main portions of the air flows 61, 62 are separated from each other to the right and left so that they do not directly collide with the silica tube of the light emitting section 12. Although the air flow does not easily flow on the upper side of the silica tube, the air flows are supplied from approximately the same positions in the low temperature and high pressure region A. Accordingly, this example is advantageous in that the air flows of the same intensity and volume can be provided. The fourth example is effective when it is applied to an apparatus provided with the low temperature and high pressure region A in which no air flows. On the other hand, the fifth example is effective when it is applied to an apparatus in which forced air cooling is required even in the low temperature and high pressure region A.

Figure 6A:
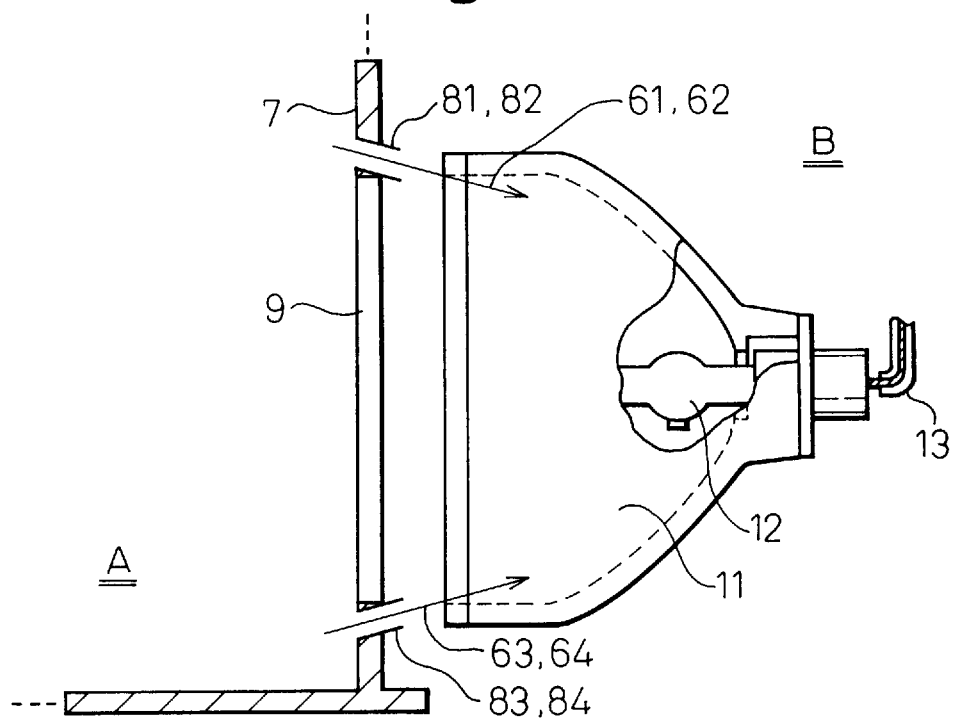
FIGS. 6(*a*) and 6(*b*) are a side view and a front view of the light source device of the sixth example of the present invention.
Figure 6B:
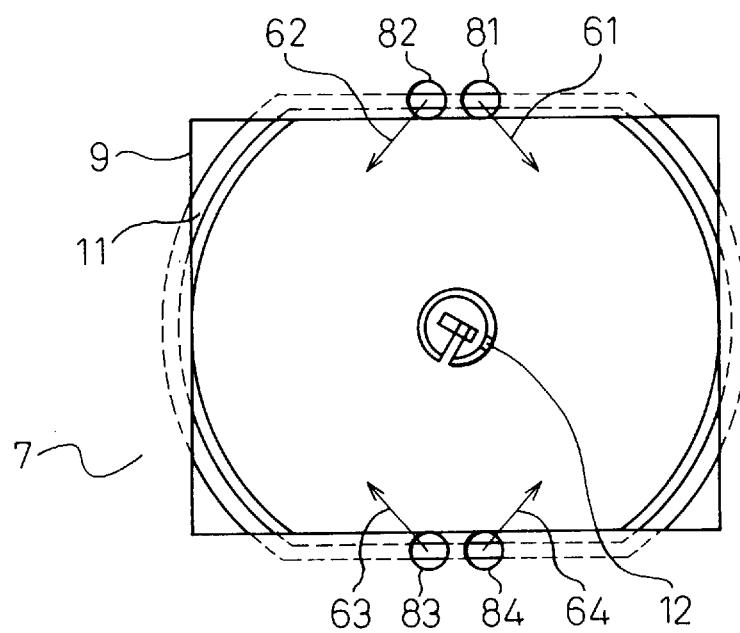

FIGS. 6(a) and 6(b) show the sixth example of the present invention. The apparatus of this example is provided with the same ventilating holes 81, 82, 83, 84 as those of the fifth example of the upper and lower sides of the transparent body 9. Air flows flow and collide in a plurality of portions around the silica tube, so that the air flows are formed in the direction of the silica tube. Due to these air flows, the entire silica tube can be uniformly cooled. Compared with the fourth and fifth examples, this example is advantageous when it is applied to an apparatus in which a pressure difference is small between the region A of low temperature and high pressure and the region B of high temperature and low pressure. Even in the apparatus in which a pressure difference is small between the region A of low temperature and high pressure and the region B of high temperature and low pressure, the entire silica tube can be uniformly cooled by a small amount of air.

Figure 7A:
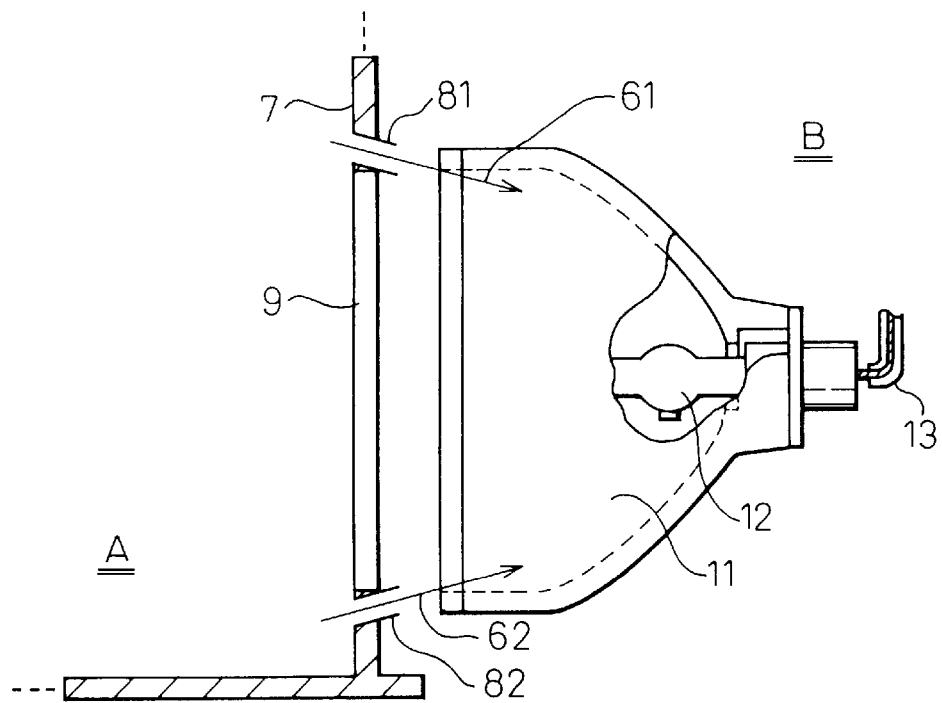
FIGS. 7(*a*) and 7(*b*) are a side view and a front view of the light source device of the seventh example of the present invention.
Figure 7B:
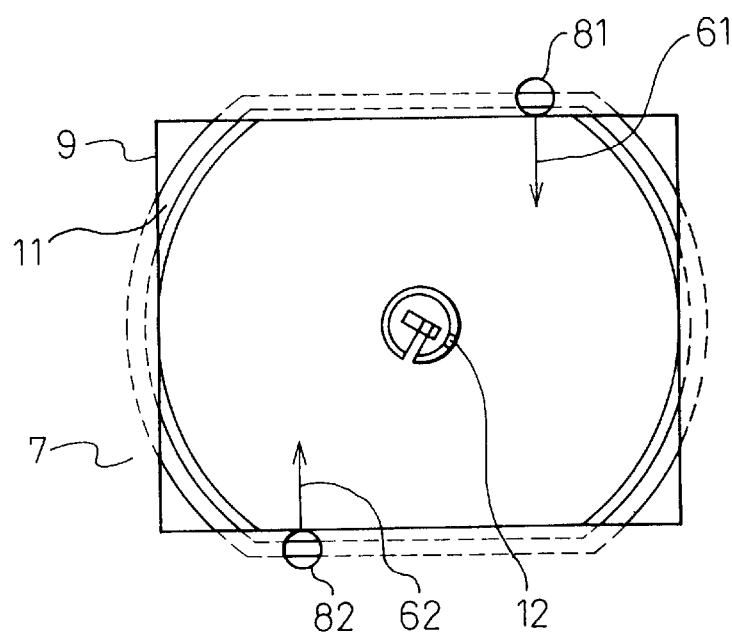

FIGS. 7(a) and 7(b) show the seventh example. In this example, main portions of the air flows 61, 62 are not on a plane including the optical axis of the concave mirror 11, and the directions of the air flows 61, 62 are in the same rotational direction with respect to the optical axis of the concave mirror 11. Therefore, while the air flows 61, 62 do not collide with each other, they are reflected on predetermined portions on the concave mirror 11. Then the air flows spirally wind around the optical axis of the concave mirror 11, that is, the air flows spirally wind around the light emitting section 12, and reach the deepest portion of the concave mirror, so that the silica tube of the light emitting section 12 is cooled. The cooling method of this example is suitable for a vertical lighting type light source device in which the apparatus is turned on under the condition that the concave mirror is set downward, that is, under the condition that the most inner part of the light emitting section 12 or the deepest portion of the concave mirror 11 is set upward, so that the generated heat tends to accumulate and the temperature is raised.

Figure 8A:
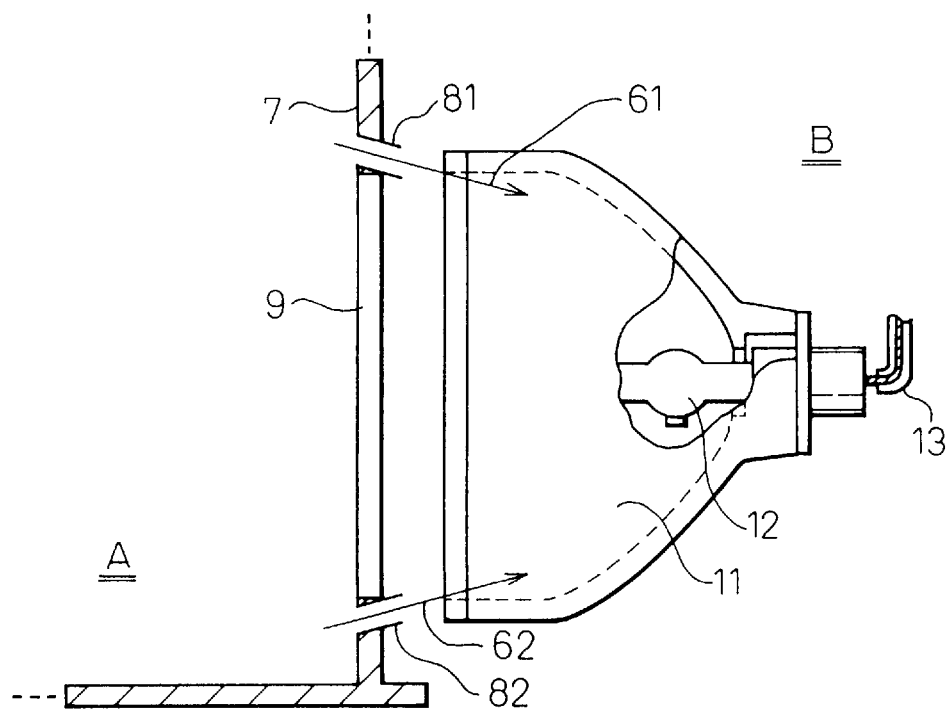
FIGS. 8(*a*) and 8(*b*) are a side view and a front view of the first variation (the eighth example) of the seventh example of the present invention.
Figure 8B:
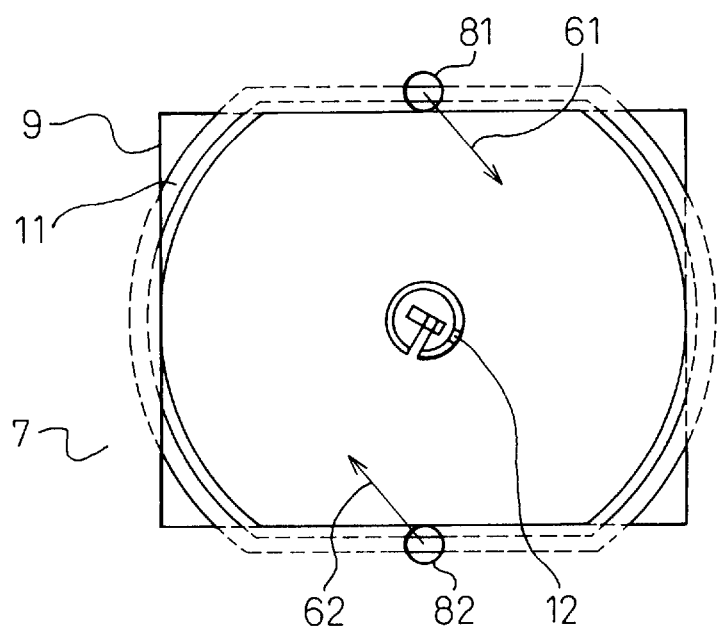

FIGS. 8(a) and 8(b) show a variation on the seventh example. In this example, compared with the seventh example, importance is attached to the spirality of the air flow, and the air flows are rotated, at a larger angle, until the air flows reach the innermost part of the concave mirror. Accordingly, when a pressure difference between the region A of low temperature and low pressure and the region B of high temperature and low pressure is large, the strongly directional air flows reach the most inner part of the concave mirror 11, so that the silica tube of the light emitting section 12 can be cooled under the condition of a uniform temperature distribution. In the actual operation, positions of the ventilating holes and directions of the air flows 61, 62 are adjusted in accordance with the pressure difference between the region of low temperature and high pressure and the region of high temperature and low pressure, and also in accordance with the amount of required wind.

Figure 9A:
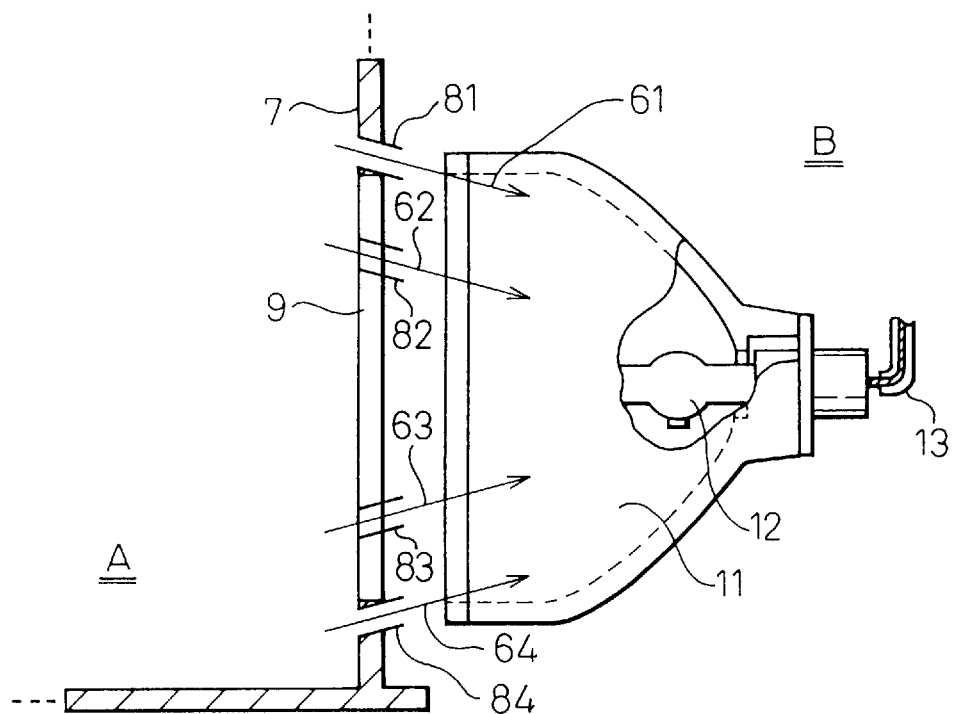
FIGS. 9(a) and 9(b) are a side view and a front view of the second variation (the ninth example) of the seventh example of the present invention.
Figure 9B:
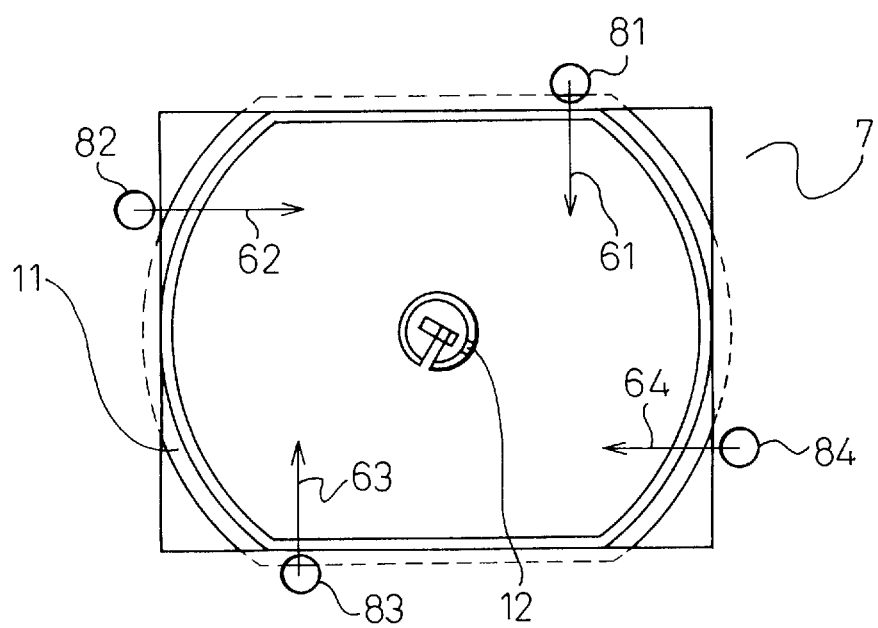

FIGS. 9(a) and 9(b) show another variation on the seventh example. Even if the pressure difference between the region A of low temperature and high pressure and the region B of high temperature and low pressure is smaller than that of the seventh example, the silica tube of the light emitting section 12 can be uniformly cooled when the number of ventilating holes is increased and the ventilating holes are uniformly arranged around the transparent body 9. In this case, the rotational directions of all the air flows 61, 62, 63, 64 are made to be the same with respect to the optical axis of the concave mirror. This is to reduce the loss caused by the collision of the air flows so that the air flows can reach the innermost part of the concave mirror 11.

Figure 10A:
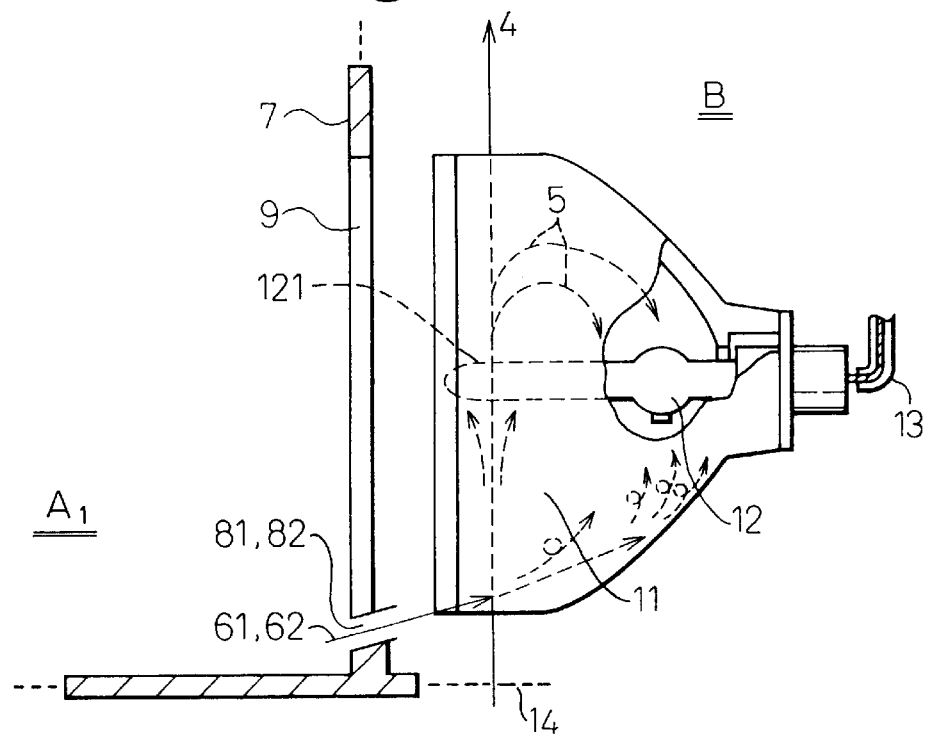
FIGS. 10(a) and 10(b) are a side view and a front view of the light source device of the tenth example of the present invention.
Figure 10B:
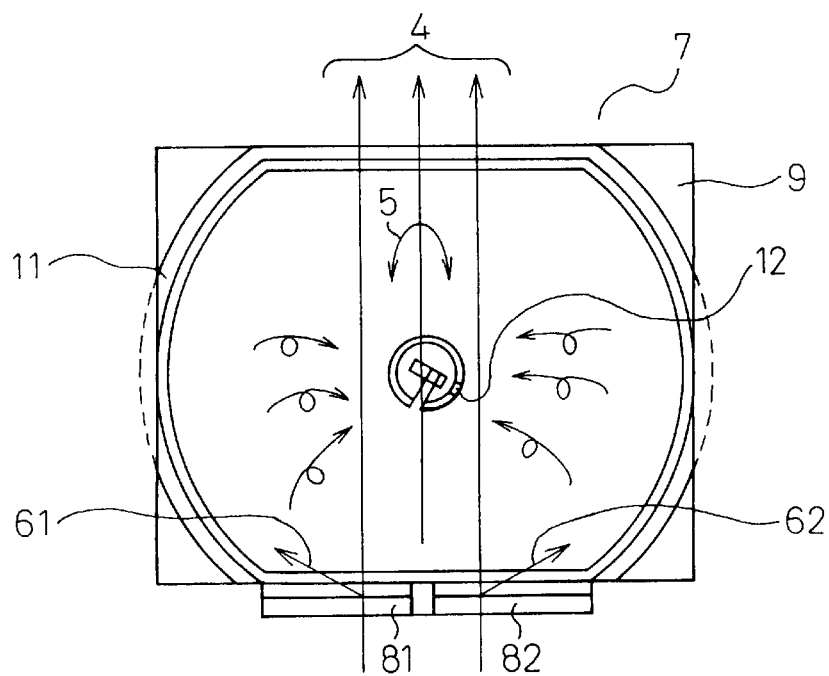

FIGS. 10(a) and 10(b) are views showing the tenth example of the present invention. The first and second regions $A_1$ and $A_2$ of low temperature and high pressure are provided being adjacent to the region B of high temperature and low pressure in which the light source is arranged. The first and second regions $A_1$ and $A_2$ of low temperature and high pressure are adjacent to each other. An opening is formed at a position on the wall 7 arranged between the region B of high temperature and low pressure and the region $A_1$ of low temperature and high pressure, and this position is opposed to a lower portion of the concave mirror 11, and a transparent body 9 is set in the opening. On the other hand, the region B of high temperature and low pressure and the region $A_2$ of low temperature and high pressure are separate from each other by a wall on which an air filter 14 is set immediately below the concave mirror 11.

Laterally long ventilating holes 81, 82 adjacent to each other in the lateral direction are provided in a portion on the wall 7 adjacent to the transparent body 9 on a side close to the second region $A_2$ of low temperature and high pressure. Through the ventilating holes 81, 82, air flows which form an angle of 80° to 120° blow out from the first region $A_1$ of low temperature and high pressure to the concave mirror 11 in the region B of high temperature and low pressure at a speed of 2 to 4 m/sec.

On the other hand, a air flow 4, the flow direction of which is approximately perpendicular to the optical axis of the concave mirror 11, flows from the second region $A_2$ of low temperature and high pressure to the region B of high temperature and low pressure at least between the transparent body 9 and the concave mirror 11 over the entire width of the transparent body 9. The wind speed of the air flow 4 is approximately 0.5 to 1.5 m/sec when the wind passes through the air filter 14.

The air flow 4 collides with the air flows 61, 62 at positions on both sides of the transparent body 9 except for the central portion of the transparent body 9 with respect to the lateral direction. Further, the air flows collide with the concave mirror wall. Then the air flows advance spirally and cool both side portions of the silica tube and the most inner part of the concave mirror.

A portion of the air flow 4, which passes through the central portion of the transparent body 9 without colliding with the air flows 61, 62, cools a fore end 121 of the light emitting section 12, and its circulating current cools an upper portion of the light emitting section 12.

According to this example, in an apparatus installed on the floor, provided with a light emitting section composed of a 250 W metal halide lamp, the temperature at the upper end of the silica tube of the light emitting section 12 was 840° C., and the temperature of a lower end of the silica tube was 800° C. In the same apparatus hung on the ceiling, the temperature of an upper end of the silica tube was 810° C., and the temperature of a lower end of the silica tube was 815° C. In either of the arrangements, at every measuring point, the temperature fluctuation was in a range of ±10° C.

Figure 11A:
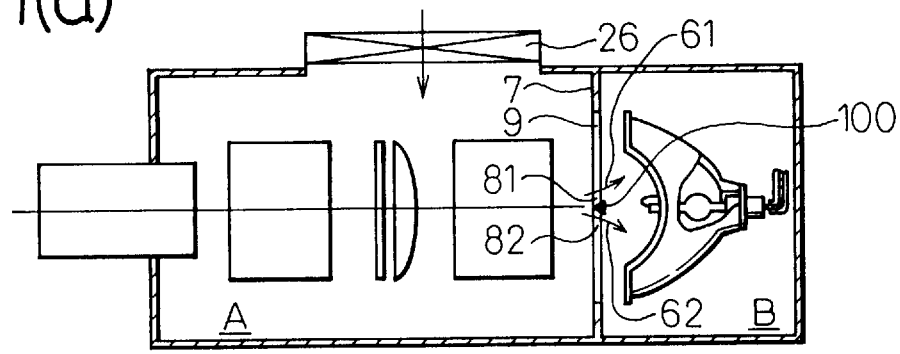
FIGS. 11(a), 11(b) and 11(c) are an upper sectional view, a side sectional view and a front view of the liquid crystal projector of the eleventh example of the present invention.
Figure 11B:
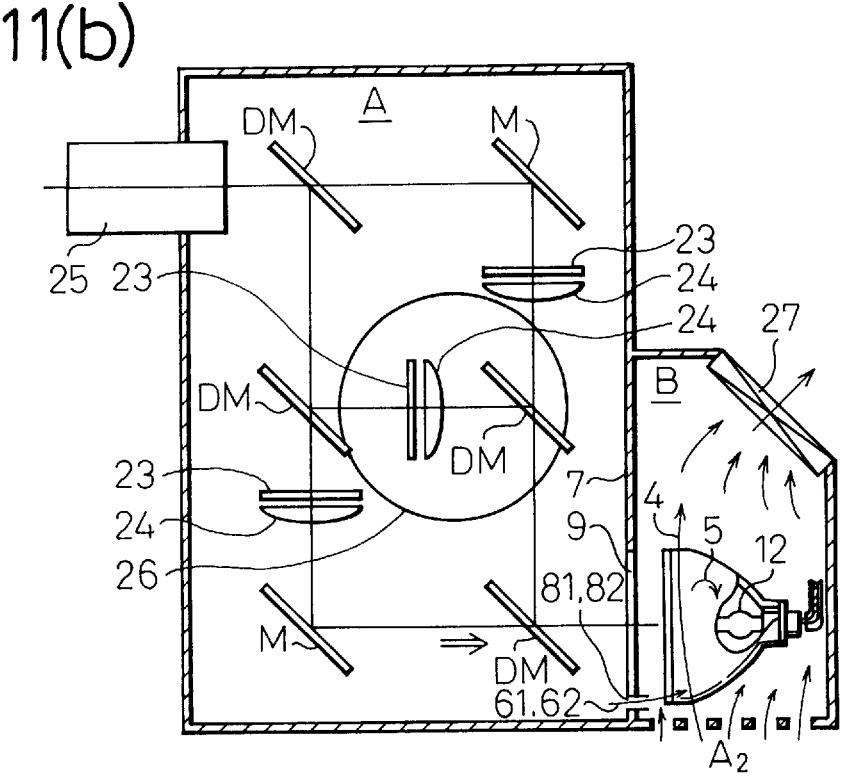
Figure 11C:
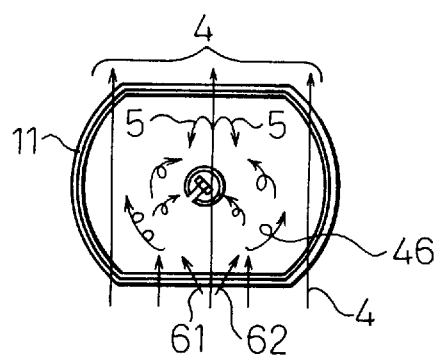

FIGS. 11(a) to 11(c) are views showing the eleventh example of the present invention. This is an example in which the light source device of the tenth example is assembled to a liquid crystal projector. In the region A of low temperature and high pressure, there are provided a color separation optical system for separating rays of light emitted from the light source into the three primary colors, a modulation system by which each of the separated three primary colors is subjected to image modulation using the liquid crystal panel, a color synthesizing system for synthesizing the rays of modulated three primary color light, and a projection system for projecting the synthesized light onto a screen. The wall 7 is provided between the region A of low temperature and high pressure and the region B of high temperature and low pressure. A rectangular hole is formed in a portion on the wall 7 opposed to the concave mirror 11. In the rectangular hole, a band pass filter 9 is set which transmits visible light and reflects ultraviolet and infrared rays. A suction fan 26 is arranged on a side of the region A of low temperature and high pressure. By the action of the suction fan 26, a wind is blown against the three liquid crystal panels 23 so that they are cooled. Accordingly, the inside of the region A is maintained at high pressure. An exhaust fan 27 is arranged in an upper portion of the region B of high temperature and low pressure, and hot exhaust gas is discharged from the region B of high temperature and low pressure by the exhaust fan 27. Therefore, pressure in the region B of high temperature and low pressure is lowered. Consequently, in the region B of low temperature and high pressure, the liquid crystal panel is effectively cooled, and for the light emitting section 12 in the region B of high temperature and low pressure, the same cooling air current as that described in the example illustrated in FIGS. 10(a) and 10(b) is provided, so that the light emitting section 12 can be effectively cooled.

According to this example, heat generated by the light source is not dispersed to the members arranged around the region A of low temperature and high pressure and the region B of high temperature and low pressure, for example, heat is not dispersed to an electric power source (not shown) for supplying power to the apparatus, an electric power source (not shown) for supplying power to the light source device, and a liquid crystal panel drive circuit (not shown). Therefore, the light emitting section 12 is effectively cooled. For this reason, the deterioration speed of the light source is low, and the light source spectrum is not deteriorated, and the illuminance is not lowered. Accordingly, it is possible to realize a liquid crystal projector which has a long life.

Figure 12A:
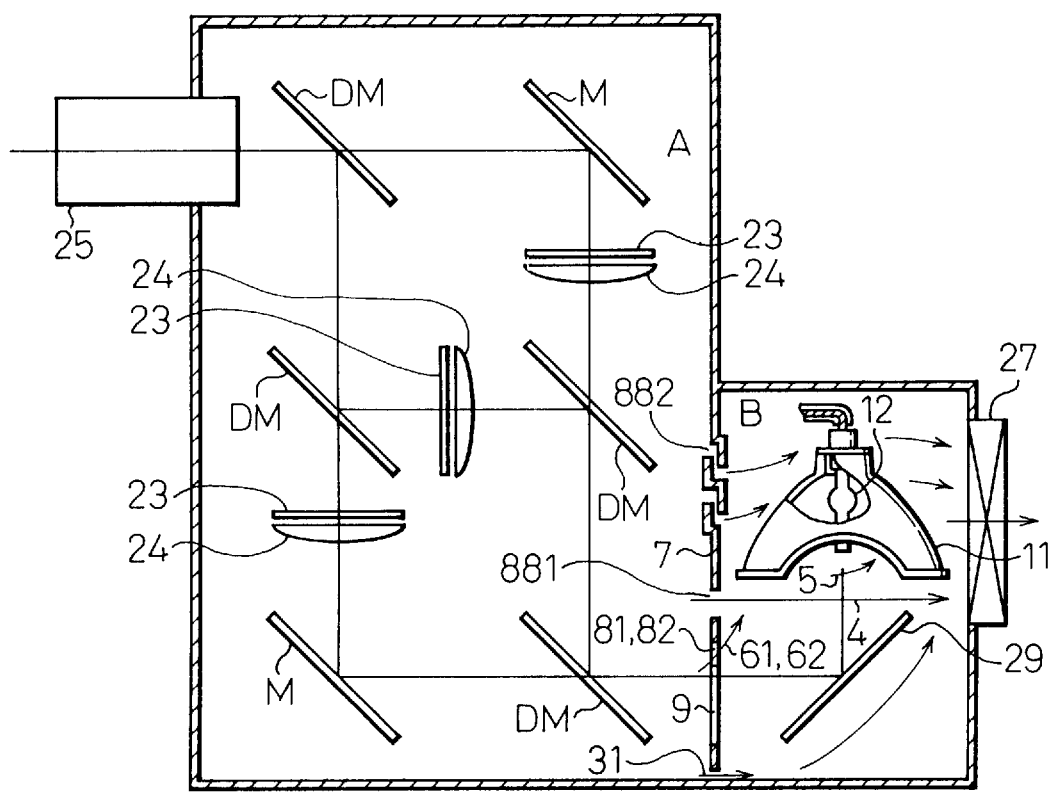
FIGS. 12(a) and 12(b) are side sectional view and front view of the liquid crystal projector of the twelfth example of the present invention.
Figure 12B:
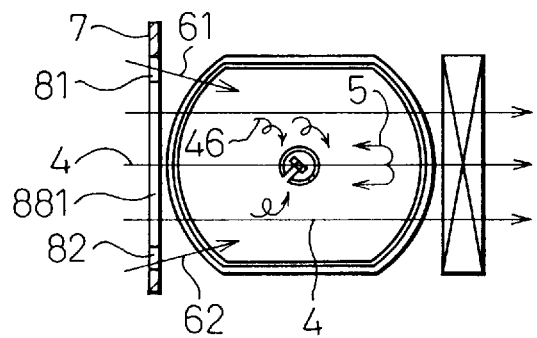

FIGS. 12(a) and 12(b) are views showing the twelfth example of the present invention. In this example, the light source device of the invention is applied to a liquid crystal projector in which an optical path of irradiated light sent from the light source is bent through a right angle by a reflection type band pass 29 and then the light is incident upon a color separation system by which light is separated to the three primary colors. In the same manner as that of the apparatus of the first example, there are provided a region A of low temperature and high pressure in which the liquid crystal panel 23 is arranged, and a region B of high temperature and low pressure in which the light source is arranged, and the regions A and B are arranged adjacent to each other.

The light source is arranged in such a manner that the wall 7 provided between the region B of high temperature and low pressure and the region A of low temperature and high pressure is approximately parallel to the optical axis of the concave mirror 11. Concerning the light irradiated by the light source, only visible light is reflected by the bond pass 29 through which ultraviolet and infrared rays are transmitted. Visible light is vertically incident upon and transmitted through the transparent body 9 engaged with a rectangular hole formed on the wall 7 located between the region B of high temperature and low pressure and the region A of low temperature and high pressure. The transmitted light is then enters the region A of low temperature and high pressure. In the region A of low temperature and high pressure, there are provided a color separation optical system for separating rays of light emitted from the light source into the three primary colors, a modulation system by which each of the separated three primary colors is subjected to image modulation using the liquid crystal panels 23, a color synthesizing system for synthesizing the rays of modulated three primary color light, and a projection system for projecting the synthesized light onto a screen. On the wall 7 adjacent to the transparent body 9, a ventilating hole 881 through which the air flow 4 flows approximately perpendicularly to the optical axis of the concave mirror 11 is formed over the entire width of the transparent body 9 on the concave mirror 11 side. In the upper and lower portions of the transparent body 9, the ventilating holes 81, 82 are formed, and the air flows 61, 62 pass through the ventilating holes 81, 82 and are sent to the most inner part of the concave mirror.

A ventilating hole 882 having a light shielding structure is formed on the wall 7 provided between the region B of high temperature and low pressure and the region A of low temperature and high pressure, wherein the ventilating hole 882 is located at a position on the side of the light source. Further, a ventilating hole 31 is formed at a lower end of the wall 7, and an exhaust fan 27 is arranged on the opposite side with respect to the light source. When the exhaust fan 27 is operated, hot exhaust gas is discharged from the region B of high temperature and low pressure, so that the pressure in the region B is reduced, and a cold with flows into the region B from the adjacent region A of low temperature and high pressure through the ventilating holes 81, 82, 881 and 882. Through the ventilating hole 881, the air flow 4 approximately perpendicular to the optical axis of the concave mirror 11 flows, and the respective air flows 61, 62 flow through the ventilating holes 81, 82. The air flows 4, 61 and 62 described here are the same as those described before. That is, in this example, both air flows are made to flow from the same region A of low temperature and high pressure. Further, in this example, an air flow flowing laterally with respect to the concave mirror 11 can be provided through the ventilating hole 882, and also an air flow is provided which flows through the ventilating hole 31 provided at the lower end of the wall 7.

According to this example, in the same manner as that of the eleventh example, heat generated by the light source is not dispersed to the members arranged around the region A of low temperature and high pressure and the region B of high temperature and low pressure, for example, heat is not dispersed to an electric power source for supplying power to the apparatus, an electric power source for supplying power to the light source device, and a liquid crystal panel drive circuit. Therefore, the light emitting section 12 is effectively cooled. For this reason, the deterioration speed of the light source is low, and the light source spectrum is not deteriorated, and the illuminance is not lowered. Accordingly, it is possible to realize a liquid crystal projector which has a long life.

Figure 13A:
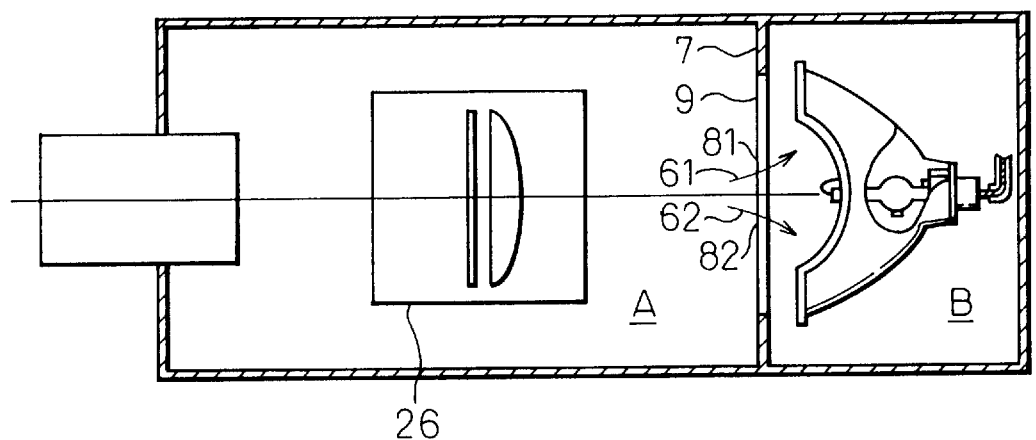
FIGS. 13(a) and 13(b) are upper sectional view and side sectional view of the liquid crystal projector of the thirteenth example of the present invention.
Figure 13B:
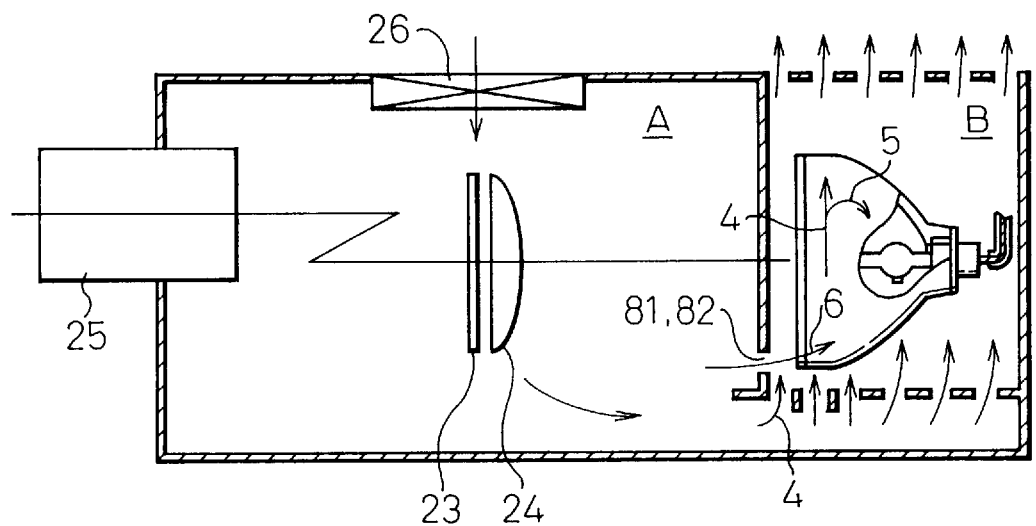

FIGS. 13(a) and 13(b) are views showing the thirteenth example. In this example, approximately the same light source device as that of the example shown in FIG. 11 is applied to a single plate type liquid crystal projector which conducts image modulation by one sheet of liquid crystal panel 23 having pixels of the three primary colors. In this example, the pressure difference between the region A of low temperature and high pressure and the region B of high temperature and low pressure is generated by the suction fan 26 arranged in the region A of low temperature and high pressure region. All air flows 4, 61 and 62 are provided from the region A of low temperature and high pressure.

Figure 14A:
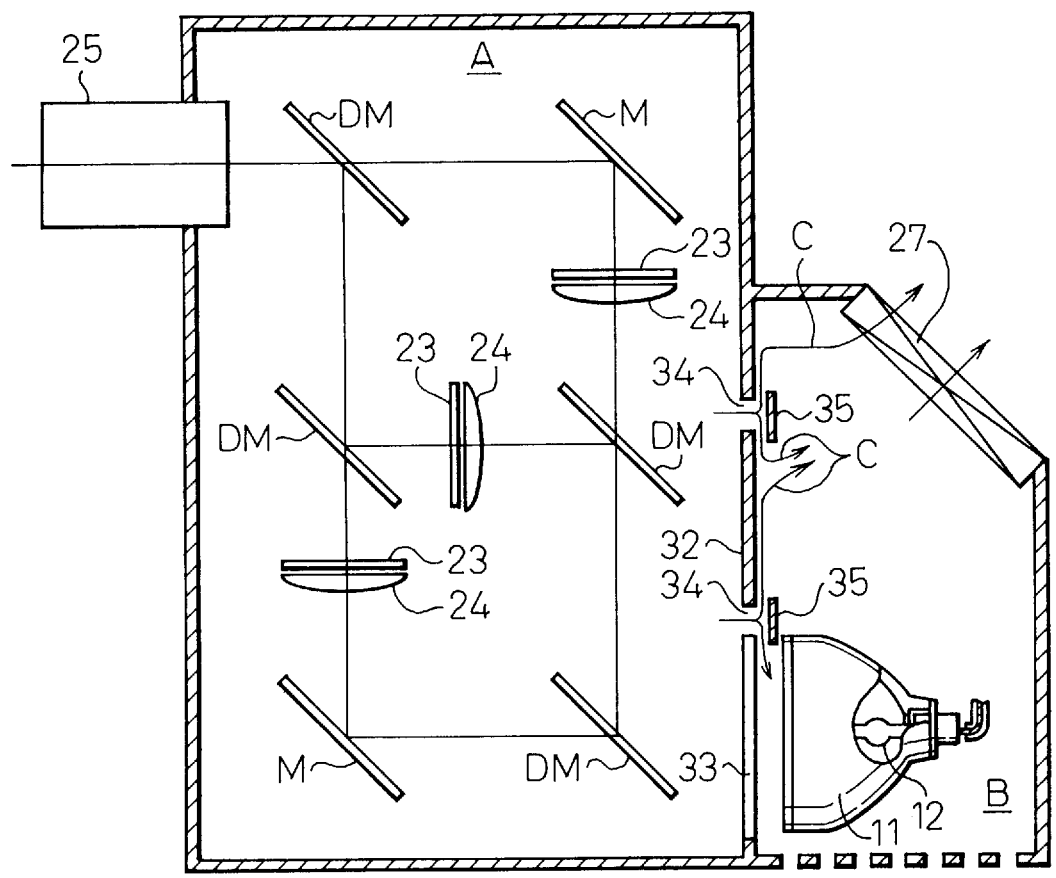
FIGS. 14(a) and 14(b) are a side sectional and a view showing the liquid crystal projector of the fourteenth example of the present invention.
Figure 14B:
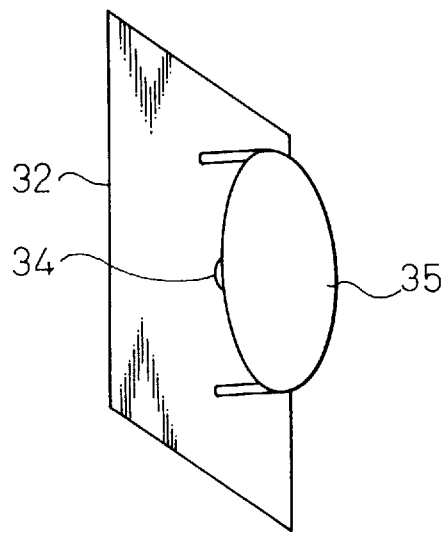

FIG. 14 is a view showing the fourteenth example of the present invention. As illustrated in the drawing, the optical unit to be irradiated (in the region A of low temperature and high pressure) includes: a group of dichroic mirrors for separating the light from the light source into the three primary colors; a liquid crystal panel for conducting image modulation on the rays of light of respective colors; a group of dichroic mirrors for synthesizing rays of modulated light; and a projection lens for projecting an image onto the screen. The lamp house (the region B of high temperature and low pressure) includes a metal halide lamp having the concave mirror 11. The optical unit to be irradiated (the region A of low temperature and high pressure) and the lamp house (the region B of high temperature and low pressure) are arranged adjacent to each other while the wall 32 is interposed between them. A portion of the wall 32 opposed to the concave mirror 11 is composed of a cut filter 33 on which ultraviolet and infrared rays are reflected and through which rays of visible light are transmitted, and other portions of the wall 32 are composed of a steel sheet, the mechanical strength of which is high so that the steel sheet is less susceptible to deformation. A plurality of ventilating holes 34, the diameter of which is 10 mm, are formed on the steel sheet composing the wall 32. A disk functioning as a wind guide plate 35, the diameter of which is 20 mm, is provided, at the portion of each ventilating hole 34, distant from the wall 32 and the ventilating hole 34 by 5 mm on the lamp house side. FIG. 14(b) is a schematic illustration showing a positional relation between the wind guide plate 35 and the ventilating hole 34.

The optical unit to be irradiated is provided with not only the ventilating holes 34 but also a function hole (not shown in the drawing) capable of communicating with the outside of the apparatus. On the other hand, an exhaust fan 27 for discharging heat generated by the light source is attached to the lamp house. As a result, when the electric power source of the liquid crystal projector is turned on and the light source starts emitting light and generating heat, the exhaust fan 27 starts rotating so that the heat is discharged from the lamp house. Therefore, the inside of the optical unit to be irradiated relatively becomes the region A of low temperature and high pressure, and the inside of the lamp house relatively becomes the region B of high temperature and low pressure. An air flow C of relatively low temperature which has flowed out from the region A of low temperature and high pressure into the region B of high temperature and low pressure through the ventilating holes 34 is guided by the wind guide plate 35 and flows inside the region B of high temperature and low pressure. After the air flow C has left the wall 32, it is mixed with air of high temperature in the region B of high temperature and low pressure and discharged outside of the apparatus by the exhaust fan 27.

Figure 15:
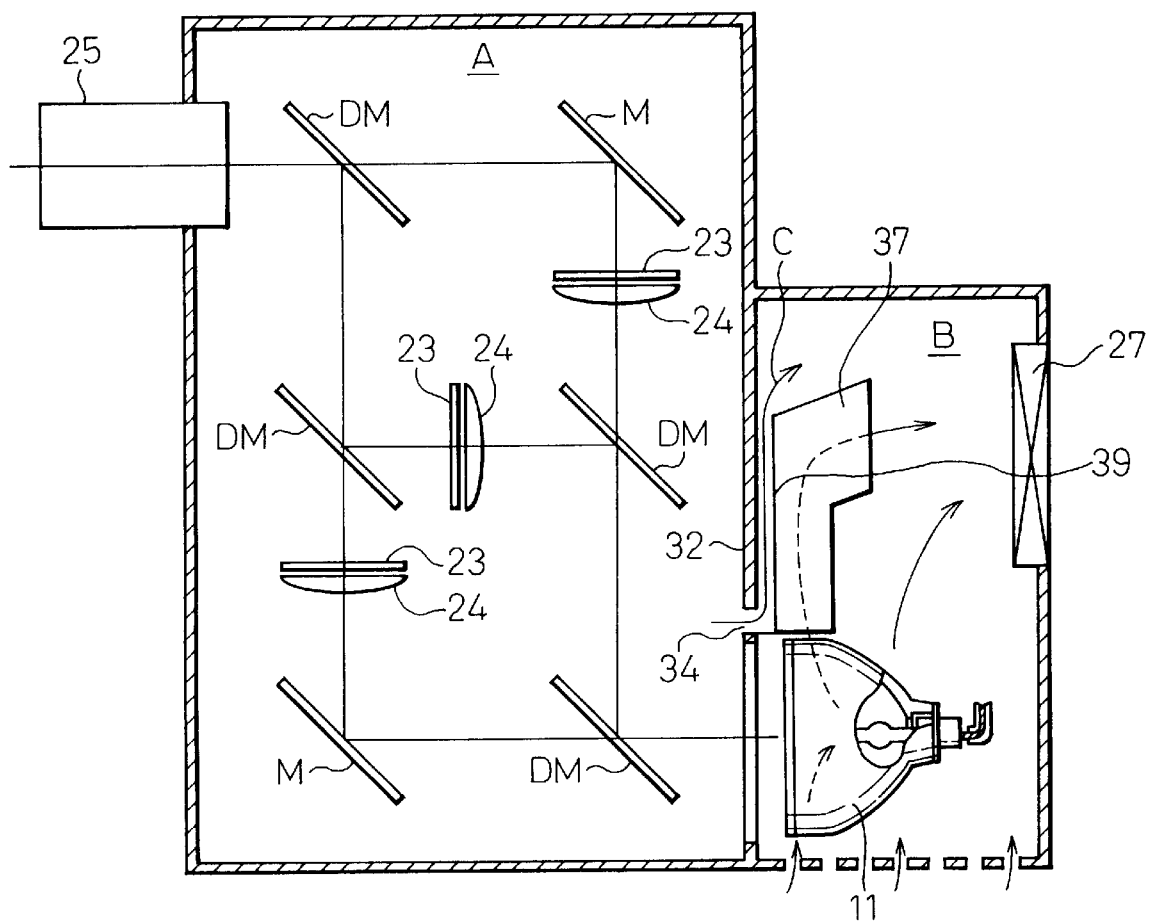
FIG. 15 is a view showing the liquid crystal projector of the fifteenth example of the present invention.

FIG. 15 is a view showing the fifteenth example. The new point of the fifteenth example, compared to the fourteenth example, is a duct 37, the inlet of which is located at the upper portion of the concave mirror 11, and the outlet of which is located at the front of the exhaust fan 27, and a wall 39 of this duct 37 is arranged in parallel with a wall 32 of the optical unit to be irradiated, and the wall 39 of this duct 37 is separate from the wall 32 of the optical unit by 3 mm. A ventilating hole 34, the height of which is 5 mm, and the length of which is the same as the width of the duct, is provided on the wall 32, so that the air flow C flows upward in a space formed between the walls 32 and 39. The wind speed of the air flow C flowing out from the ventilating hole 34 is 0.5 mm/sec and the flow rate of the air flow C is approximately 150 cc/sec.

When the room temperature was 27° C., the highest temperature of the wall 39 of the duct 37 was measured at a lower portion of the duct 37, and was 155° C. On the other hand, the highest temperature of the wall 32 was measured at an upper portion, and was not more than 45° C. An increase of the temperature of the liquid crystal panel caused by the heat transmitted through the wall was not more than 1° C., which seldom affects the apparatus.

Figure 16:
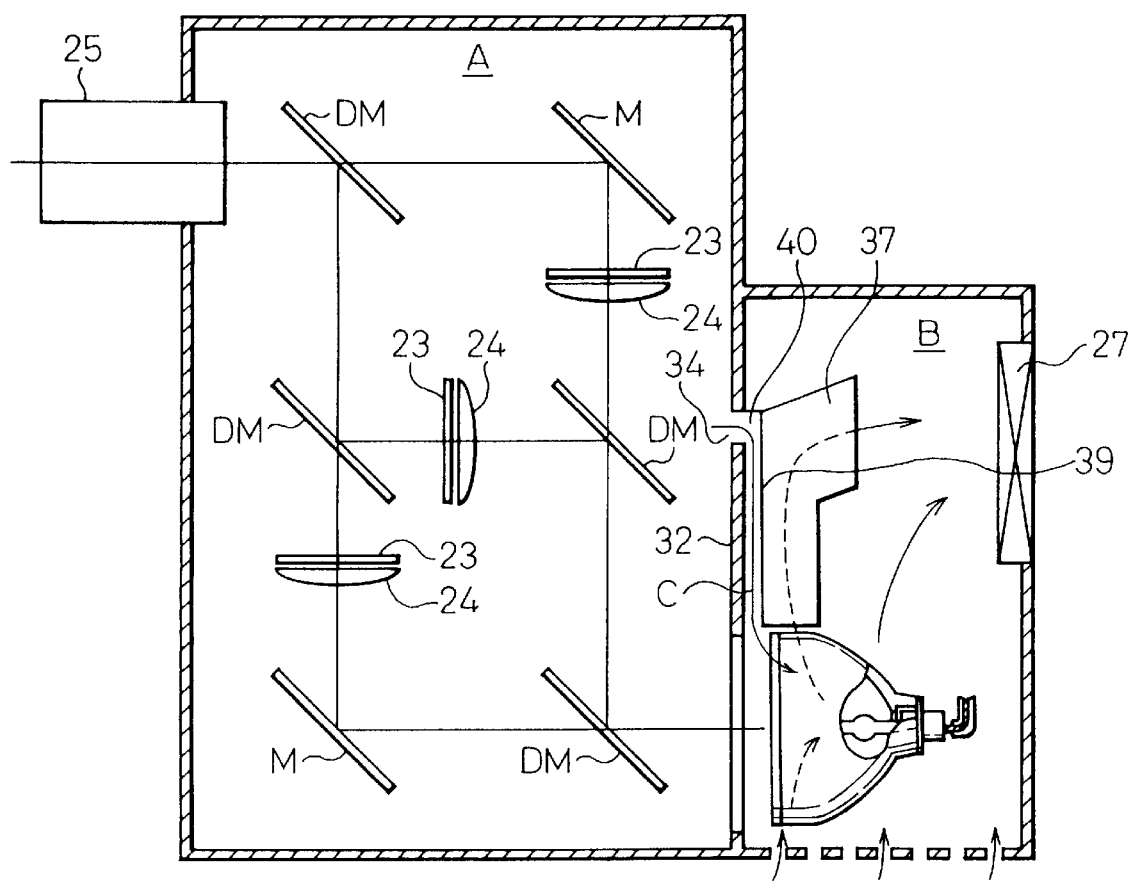
FIG. 16 is a view showing the liquid crystal projector of the sixteenth example of the present invention.

FIG. 16 is a view showing the sixteenth example of the present invention. The new points of the sixteenth example compared to the fifteenth example are that the ventilating hole 34 is located at a relatively upper position with respect to the duct 37, and that the air flow C flows downward in the low pressure passage 40 formed between the walls 32 and 39. In this example, the generated heat can be smoothly conveyed out from the concave mirror 11 in the following manner: The air flow C passes through the ventilating hole 34 from the region A of low temperature and high pressure. Heat of convection transmitted from the duct 37 of the high temperature region to the optical unit to be irradiated, which is the region A of low temperature and high pressure, is intercepted. After the air flow C has passed through a lower end of the wall 39, it is made to flow toward the inside of the concave minnor 11 so that the air flow C does not directly collide with the light emitting section 12. In this way, heat conveyance is smoothly carried out.

Figure 17:
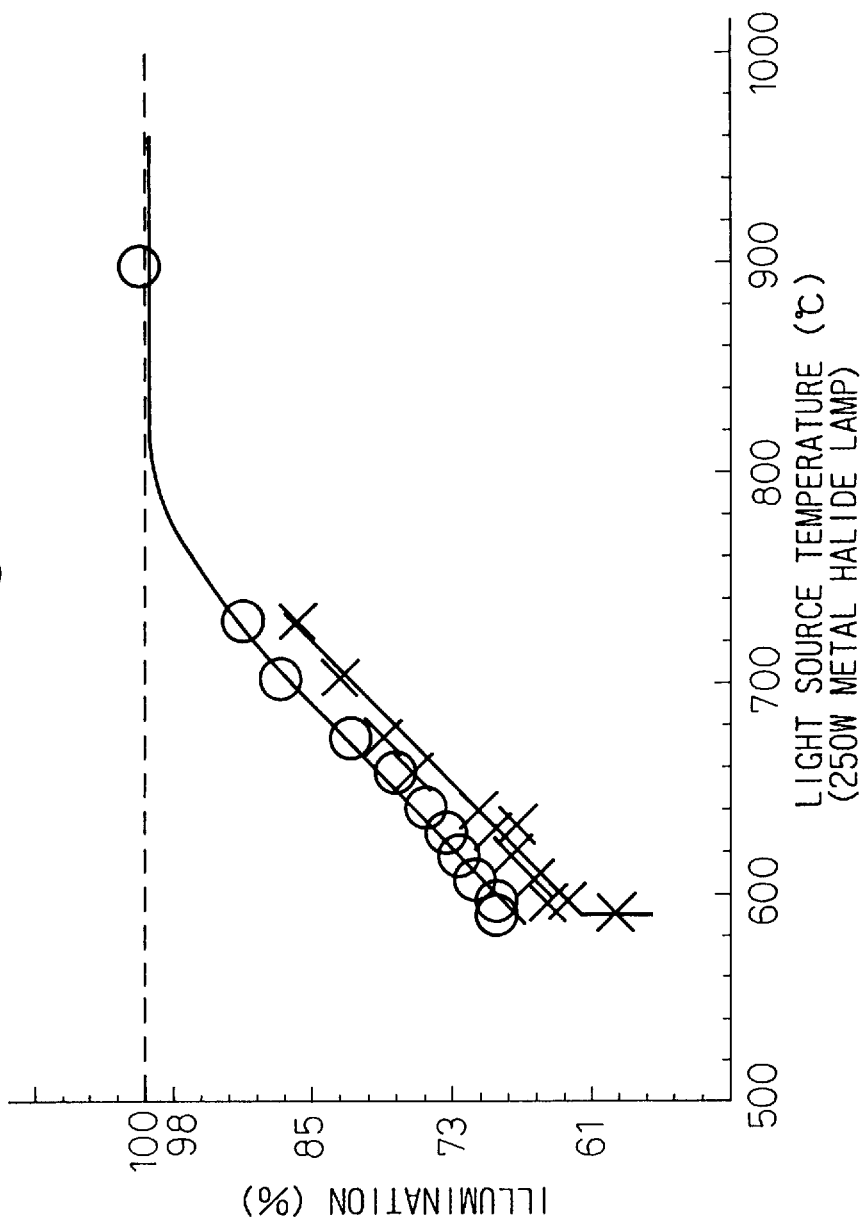
FIG. 17 is a graph showing a relation between the silica tube temperature of a metal halide light source and the screen illuminance.
Figure 18:
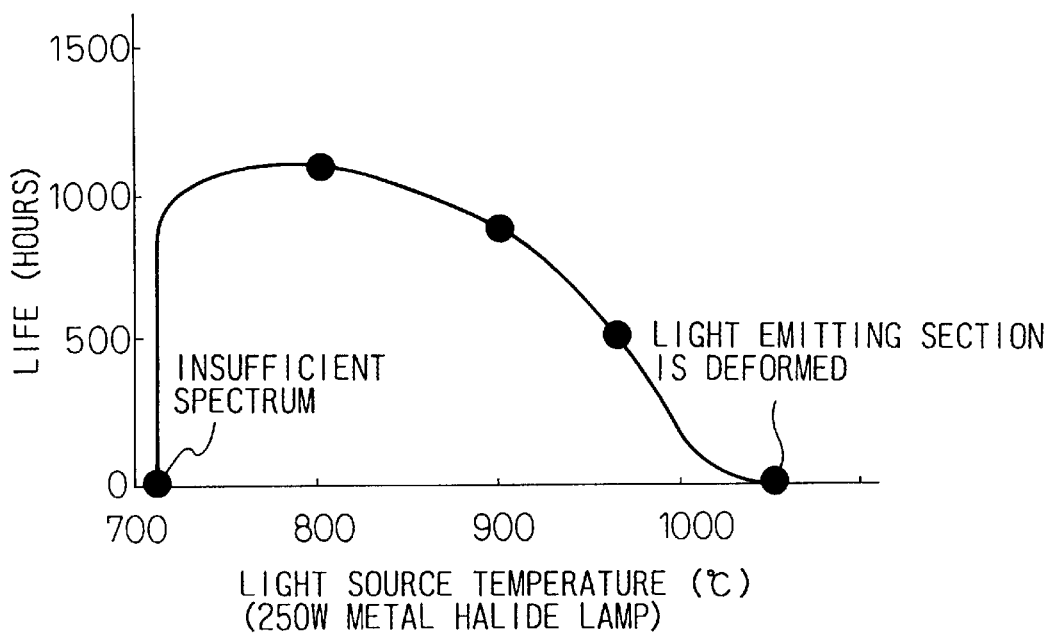
FIG. 18 is a graph showing a relation between the temperature of a silica tube of a metal halide light source and the life.

In this connection, FIG. 17 is a graph showing the relationship between the temperature of a metal halide lamp and the screen illuminance. It can be seen from the graph that the illuminance fue when the temperature was less than 800° C. FIG. 18 is a graph showing a relation between the temperature of a metal halide lamp and the life (hours). On the high temperature side, that is, when the temperature was not less than 1000° C., the light emitting section was deformed in a short period of time. On the low temperature side, that is, when the temperature was not more than 1000° C., the life of the metal halide lamp was represented by the time at which the initial illuminance was reduced to 50% at the temperature of 900° C., that is, under the condition that the spectrum hardly changed.

FIGS. 19, 20(a), 20(b), 21(a) and 21(b) are views showing specific example of the liquid crystal projector corresponding to the example shown in FIG. 11. In these views, reference numeral 40 denotes an optical unit which is the region A of low temperature and high pressure. In optical unit, there are provided a dichroic mirror DM, a total reflection mirror M, a liquid crystal panel 23, a condenser lens 24, and a projection lens 25. On the other hand, reference numeral 42 is a light source unit which is the region B of high temperature and low pressure. In the light source unit 42, there are provided a concave mirror 11, a light emitting section 12, and an electrode 13. A transparent cut filter 9 through which rays of light emitted by the light source are transmitted is arranged on the wall 7 between the optical unit 40 and the light source unit 42. There are also provided two ventilating holes 81, 82 on the lower side of the wall 7, so that air flows 61, 62 flow out from the two ventilating holes.

Figure 20A:
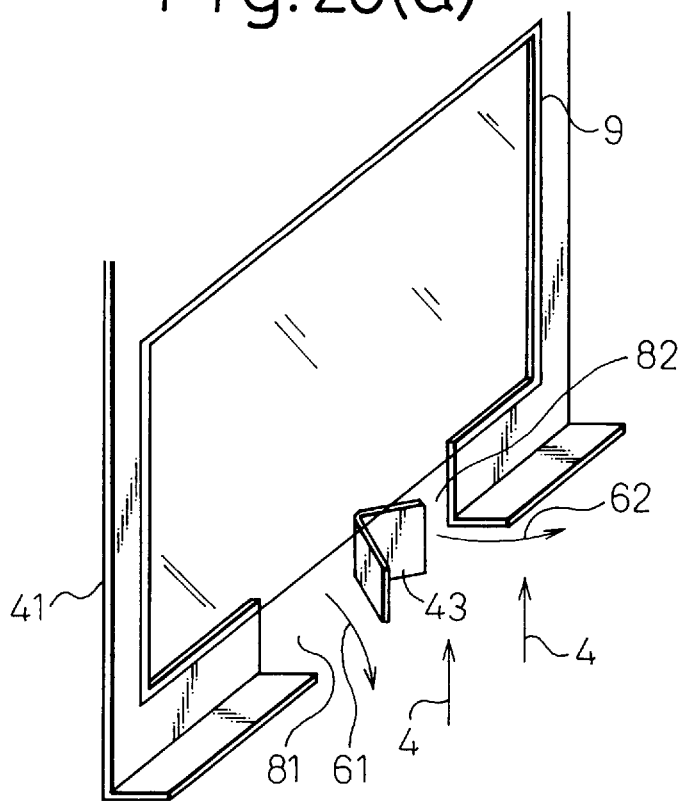
FIGS. 20(a) and 20(b) are views showing the optical unit of the liquid crystal projector shown in FIG. 19, wherein the views are taken from the light source side.
Figure 20B:
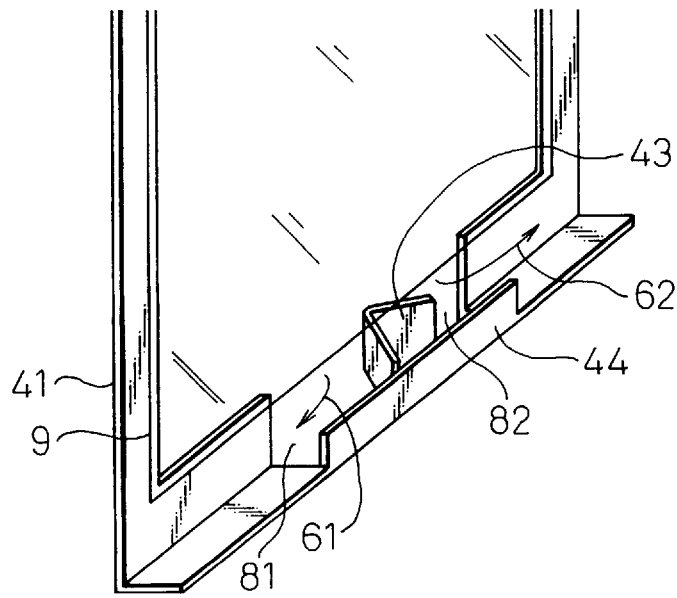

As illustrated in FIGS. 20(a) and 20(b), the two ventilating holes 81, 82 are formed in such a manner that a V-shaped wind guide 43 is arranged at the center of an opening located on the lower side of the cut filter 9 in the optical unit case 41. As illustrated in FIG. 20(a), when air flows 61, 62 flowing out from the ventilating holes 81, 82 collide with the air flow 4 flowing upward in front of the concave mirror 11 in the optical unit 42, they are directed upward. Alternatively, the air flows 61, 62 are directed upward by the wind guide 44 arranged immediately before the ventilating holes 81, 82 as illustrated in FIG. 20(b). In this way, the air flows 61, 62 advance to the inside of the concave portion of the concave mirror 11.

Figure 21A:
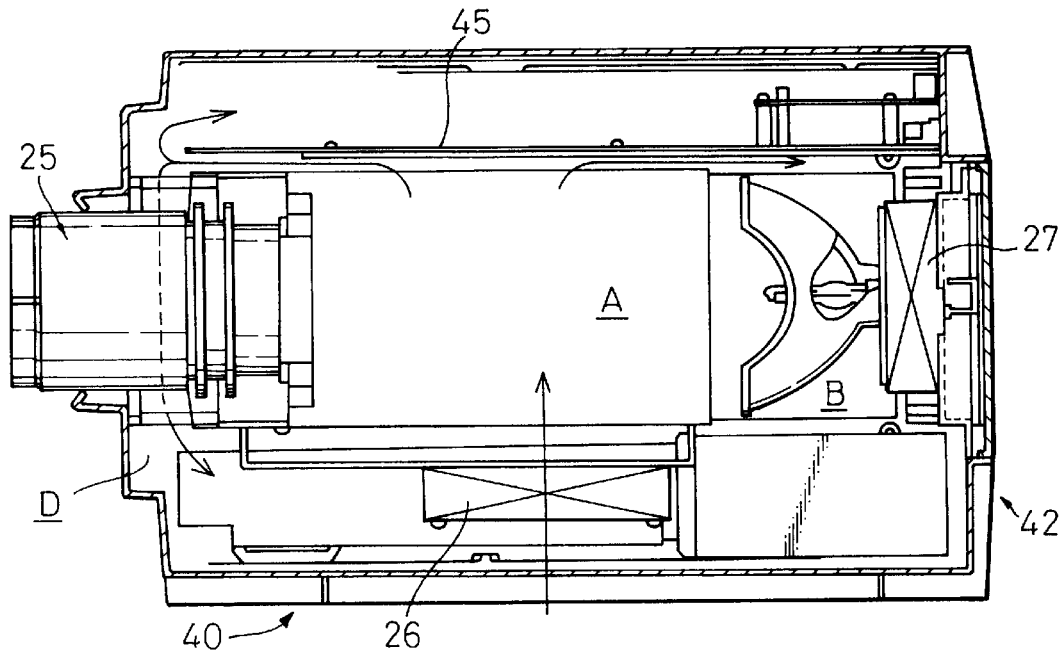
FIGS. 21(a) and 21(b) are an upper sectional view and a side sectional view showing the liquid crystal projector shown in FIG. 19, wherein an air current is shown in the view.
Figure 21B:
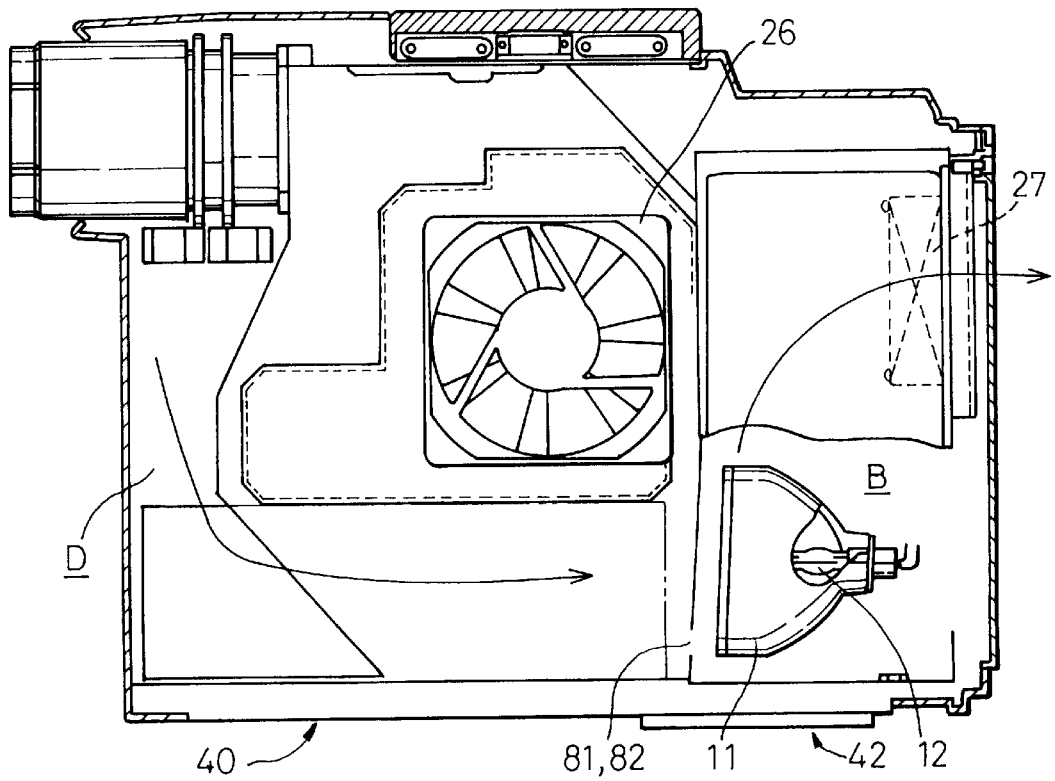

FIGS. 21(a) and 21(b) are views showing an apparatus in which forced air cooling is carried out by a suction fan 26 arranged on the optical unit 40 side and an exhaust fan 27 arranged on the light source unit 42 side. In FIGS. 21(a) and 21(b), the entire air flow in this apparatus is shown by arrows. First, the outside air is introduced into the optical unit 40, which is the region A of low temperature and high pressure, by the suction fan 26, so that the liquid crystal panel is cooled. Then the introduced outside air makes a detour around the printed board 45, and a portion of the introduced air is discharged outside by the exhaust fan 27, however, most of the introduced air advances to the outside region D and is introduced to the lower side and made to flow onto the light source unit 42 side from the ventilating holes 81, 82. On the light source unit 42 side, by the action of the exhaust fan 27, air currents 61, 62 are introduced from the optical unit 40 side to the light source unit 42 side through the ventilating holes 81, 82, and at the same time the outside air is directly taken into the apparatus from an air intake arranged on the lower side.

Figure 22:
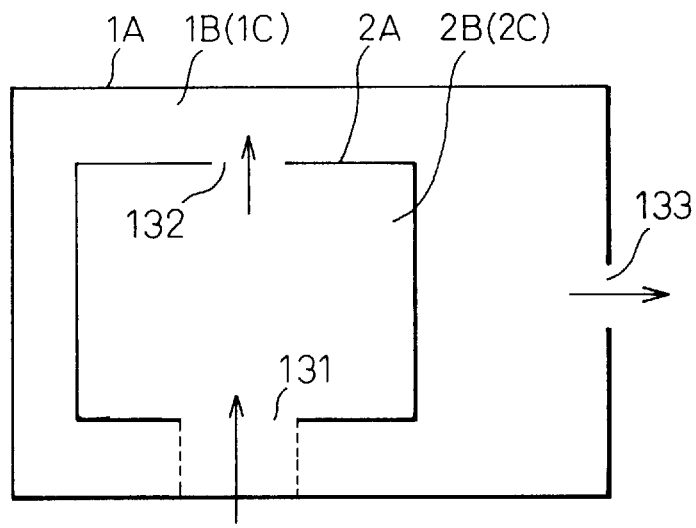
FIG. 22 is a schematic illustration for explaining another example of the present invention.
Figure 23:
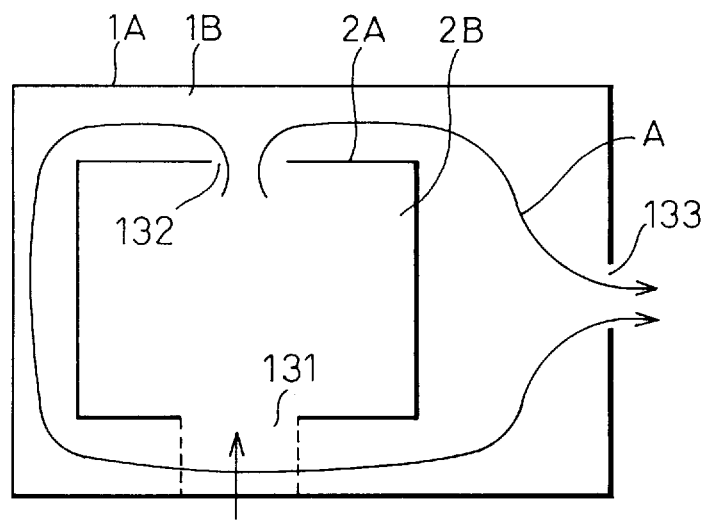
FIG. 23 is a schematic illustration for explaining an air flow in the example shown in FIG. 22.
Figure 24:
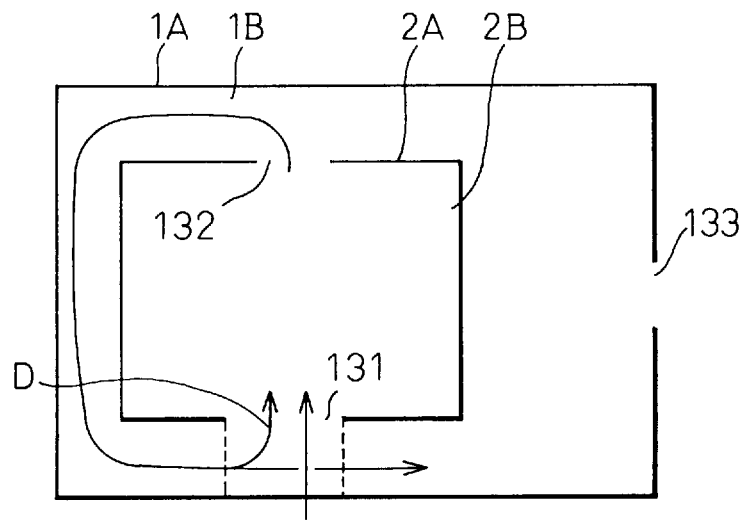
FIG. 24 is a schematic illustration for explaining another air flow in the example shown in FIG. 22.

FIGS. 22 to 24 are schematic illustrations showing another example. In FIG. 22, there is provided an enclosing wall 2A around the member accommodating space 2B. The member accommodating space 1B is provided around the enclosing wall 2A. There is provided an enclosing wall 1A around the member accommodating space 1B. On the enclosing wall 2A, there are provided a ventilating hole 131 for introducing the outside air into the member accommodating space 1B, and a ventilating hole 132 for making air to flow from the member accommodating space 2B to the member accommodating space 1B. On the enclosing wall 1A, there is provided a ventilating hole 133 for discharging air from the member accommodating space 1B to the outside of the apparatus.

In this example, air is made to flow successively in the following manner: Air is taken from the outside of the enclosing wall 1A by a cooling fan (not shown in the drawing). Then air is made to flow into the member accommodating space 2B through the ventilating hole 131 provided on the enclosing hole 2A. Then, air is made to flow from the member accommodating space 2B to the member accommodating space 1B through the ventilating hole 132. After that, air is made to flow from the member accommodating space 1B to the outside of the enclosing wall 1A through the ventilating hole 133 formed on the enclosing wall 1A.

In this case, the enclosing wall 1A covers a plane area of 200×300 mm which is a little larger than the area of size A4, and the enclosing wall 2A covers a plane area of 110×220 mm. At this time, the member accommodating space 1C accommodates a member, the thickness of which is 10 mm, and the width of the most narrow passage of which is 35 mm. It was confirmed that the air flowed into all the corners of the member accommodating spaces 1B and 2B.

As illustrated in FIG. 23, an air flow flows from the member accommodating space 2B into the member accommodating space 1B passing through the ventilating hole 132. Then the air flow is divided into two. One is an air flow which rotates clockwise and flows in a short passage A, and the other is an air flow which rotates counterclockwise and flows in a long passage B (detour). It is possible to adjust an air flow in the long passage B (detour) when the short passage A is made to be narrow, or alternatively, as illustrated in FIG. 24, a gas volume of the circulating current D flowing from the ventilating hole 131 into the member accommodating space 2B is increased.

Figure 25:
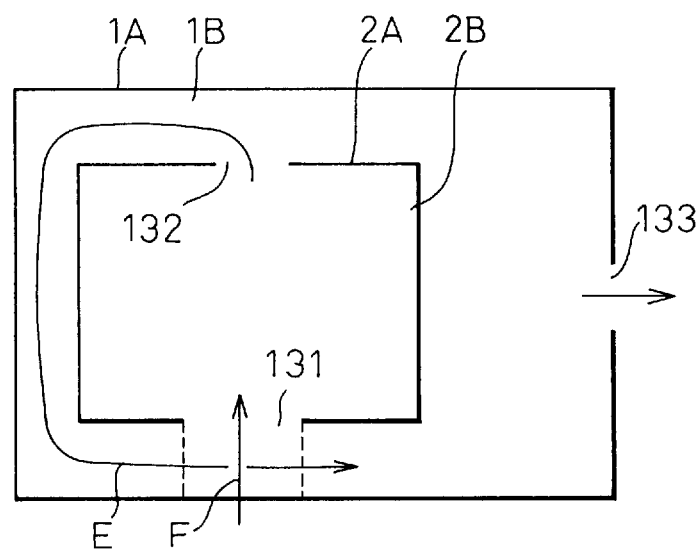
FIG. 25 is a schematic illustration for explaining still another example of the present invention.

As illustrated in FIG. 25, the air flow E which makes a detour in the member accommodating space 1B rotating counterclockwise is made to cross the air flow F when a wind guide for guiding the detour current E is arranged in the case where the wind E is not circulated or in the case where a portion of the current is directed to the ventilating hole 133 without being circulated. Due to the foregoing, the detour current E is capable of flowing into the ventilating hole 133 formed on the enclosing wall 1A without causing a pressure loss by air interference. As described above, the length of the gas flow passage is 1100 mm in total. Therefore, it was possible to make the wind to flow into all the corners of the member accommodating spaces 1B and 2B, so that the apparatus was effectively cooled.

Figure 26:
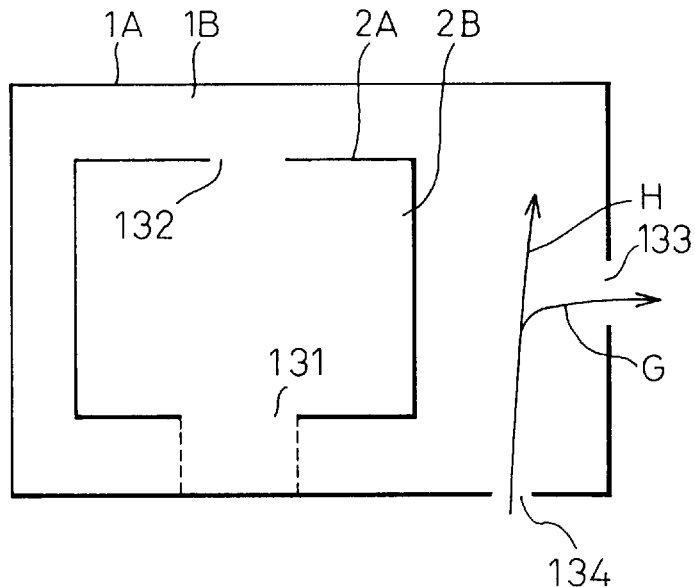
FIG. 26 is a schematic illustration for explaining still another example of the present invention.

As illustrated in FIG. 26, even when the ventilating hole 134 to be used as a suction port is provided on the enclosing wall 1A as well as the ventilating hole 133 to be used as an exhaust hole, as long as the exhaust capacity of the ventilating hole 133 is increased, the air flows shown in FIGS. 1 to 4 are seldom changed, and new air flows G and H are generated. Accordingly, it was possible to locally cool a member (not shown in the drawing), the amount of generated heat of which was large, arranged between the ventilating holes 134 and 133.

Figure 27:
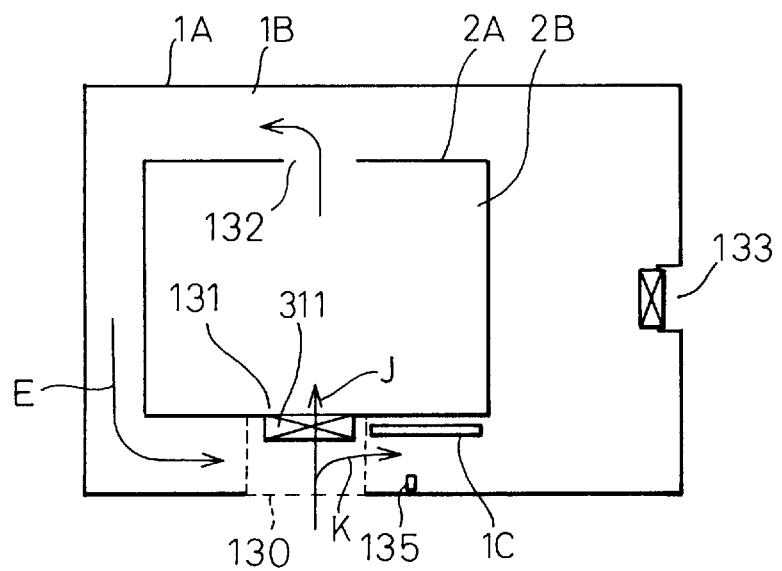
FIG. 27 is a schematic illustration for explaining still another example of the present invention.

As illustrated in FIG. 27, it is impossible to cool a member 1C arranged on the right of the fan 311 by the detour air flow E, because the member 1C is located behind the detour current E. However, when a portion K of the air flow J that has flowed into the member accommodating space 1B from the outside through the ventilating hole 130 provided on the enclosing wall 1A flows to the right immediately before the fan 311. Therefore, the member 1C is cooled by this portion K of the air flow J. In this connection, reference numeral 135 is a wind guide for directing the gas flow K to the member 1C.

Figure 28A:
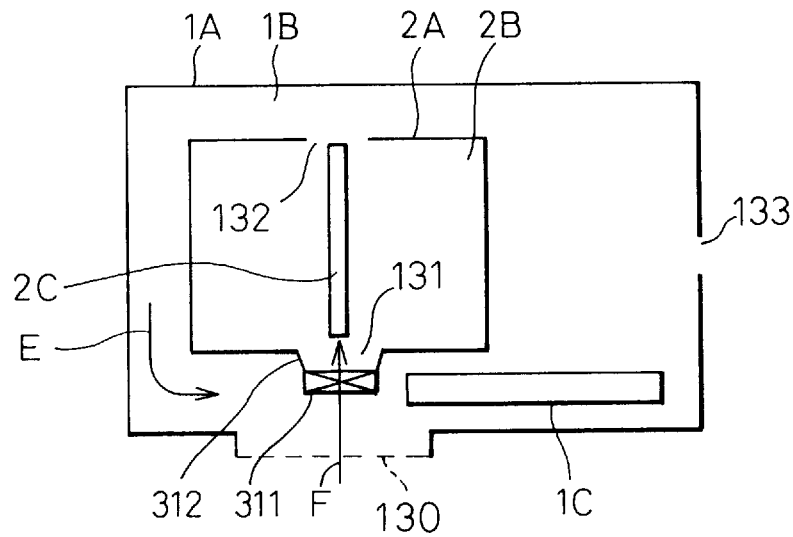
FIGS. 28(a) and 28(b) are an upper sectional view and a side sectional view for explaining still another example of the present invention.
Figure 28B:
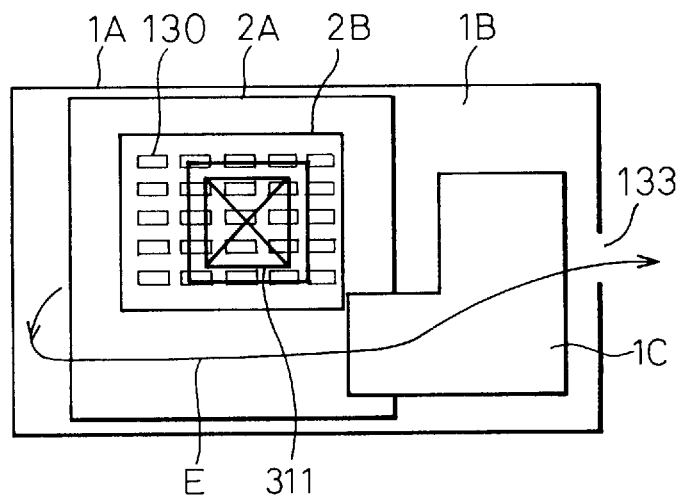

FIGS. 28(a) and 28(b) are views showing an example in which a fan 311 and wind guide 312 are provided and a portion of the enclosing wall 2A where the ventilating hole 131 is formed protrudes into the enclosing wall 1A side. A fore end of the member 2C is located close to the ventilating hole 131. In order to reduce a pressure loss of the gas flow F caused by the fore end of the member 2C to be as small as possible, that is, in order to cool effectively, the fore end of the member 2C is distant from the fan 311 by not less than 20 mm. When a distance between the enclosing wall 1A and the fan 311 is too short, a wind passing through the ventilating hole 131 is disturbed so that the pressure loss is increased and the noise level is also increased. Accordingly, the fan 311 is separate from the enclosing wall 1A (ventilating hole 30) by not less than 40 mm. Since the wind guide 312 and fan 311 protrude into the member accommodating space 1B, the passage in the member accommodating space 1B is curved in this portion and further the sectional area of the passage is reduced, so that the passage resistance is high. As a result, the detour current evades this portion and flows onto the lower side of the fan 311, so that the member 1C is cooled. In order to reduce the pressure loss of the air flow at this time, the distance between the enclosing walls 1A and 2A is extended as much as possible. In this connection, reference numeral 130 is a ventilating hole formed on the enclosing wall 1A in front of the fan 311.

Figure 29A:
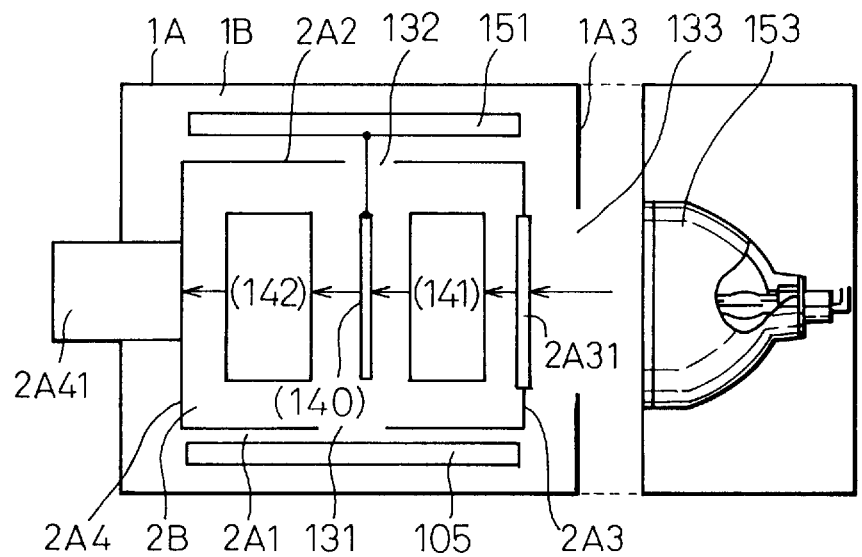
FIGS. 29(a) and 29(b) are an arrangement view showing an outline of the case and a view showing an air flow of the case, in which the present invention is applied to a liquid crystal projector.
Figure 29B:
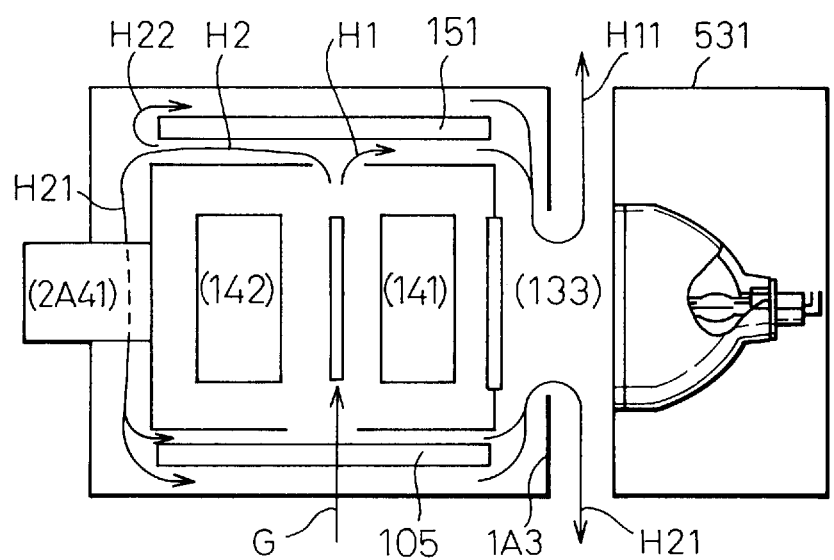

FIGS. 29(a) and 29(b) are views showing a specific example of the optical apparatus to which the present invention is applied. In the member accommodating space 2B, there are provided optical members including a spatial modulation element 140, and the optical members compose a predetermined optical system. A transparent body 2A41 through which rays of light are emitted from the member accommodating space 2B to the outside of the apparatus is engaged with a portion 2A4 of the enclosing wall 2A. A transparent body 2A31 through which rays of light of the light source 153 accommodated in the member accommodating space 1B are incident on the member accommodating space 2B is engaged with a portion 2A3 opposed to the portion 2A4. In another portion 2A1 of the enclosing wall 2A and a portion 2A2 opposed to the portion 2A1, there are respectively provided ventilating holes 131, 132. In the member accommodating space 1B adjacent to the portions 2A1 and 2A2, there are provided printed boards 105 and 151.

Since the light source housing 531 is generally separate from the enclosing wall 1A, air flows H11 an H21 that have flowed into the member accommodating space 1B from the ventilating hole 132 and respectively flow into the short and long flowing passages in the member accommodating space 1B pass through the ventilating hole 133 and discharge to the outside of the enclosing wall 1A. The air flows H11 and H21 that have flowed out from the ventilating hole 133 flow between the light source housing 531 and the portion 1A3 of the enclosing wall 1A adjacent to the light source housing 531. Accordingly, a flow of heat from the light source housing 531 to the enclosing wall 1A can be effectively prevented.

FIGS. 30 to 32 are views showing a specific example of the 3 plate type liquid crystal projector. As illustrated in FIG. 30, this liquid crystal projector comprises a pretreatment system 141, an after-treatment system 142, and a projection lens 2A41. The pretreatment system 141 includes: a light source 153; a UV/IR cut filter 2A31 for reflecting and removing the ultraviolet and infrared rays from the irradiation light emitted by the light source 153; a dichroic mirror DM which conducts color separation on the visible light that has been transmitted through the UV/IR cut filter 2A31 so that the visible light is separated into the three primary colors; and a total reflection mirror M. The after-treatment system 142 includes: three liquid crystal panels 402, 403, 404 by which rays of light of the three primary colors are respectively subjected to spatial modulation; a dichroic mirror DM for synthesizing the rays of light of the three primary colors that have been subjected to spatial modulation; and a total reflection mirror M. The projection lens 2A41 projects the rays of light subjected to spatial modulation onto a screen. In FIG. 30, numeral 181 is a light emitting body (metal halide lamp), numeral 182 is a concave mirror, numerals 183, 184 are wind guides for guiding the air flows K and L to cool the light source 153, and numeral 185 is a condenser lens.

The optical unit case 2A includes: a pretreatment system 141 composed of the dichroic mirror DM and the total reflection mirror M; an after-treatment system 142 composed of three liquid crystal panels 402, 403, 404 by which rays of light of the three primary colors are respectively subjected to spatial modulation, the dichroic mirror DM for synthesizing the rays of light of the three primary colors that have been subjected to spatial modulation, and the total reflection mirror M; and a projection lens 2A41 for projecting rays of light subjected to spatial modulation onto a screen.

The UV/IR cut filter 2A31 and the projection lens 2A41 are respectively attached onto the wall surfaces 2A3 and 2A4 of the optical unit case 2A which are opposed to each other.

The light source 153 is arranged on the outside of the optical unit case 2A under the condition that the light source 153 faces the UV/IR cut filter 2A31. Electric power of the lamp is 250 W. Most of the electric power is converted into heat in the light source housing. Temperature of the lamp is approximately 1000° C. Temperature of the housing around the lamp is approximately 200° C.

The liquid crystal panels 402, 403, 404 are arranged in front of the light source in the optical unit case 2A, wherein the liquid crystal panels are distant from the light source by only 100 to 200 mm. The width of the liquid crystal panel is 120 mm, and the height is 100 mm. In order to operate the liquid crystal panels normally, it is required that the temperature is maintained to be not higher than 60° C. Concerning the polarizing film arranged close to both sides of the liquid crystal panel so that the polarizing film absorbs unnecessary light and converts the absorbed light into heat, it is required that the temperature of the polarizing film is maintained to be not higher than 60° C. for the prevention of deterioration.

Figure 31A:
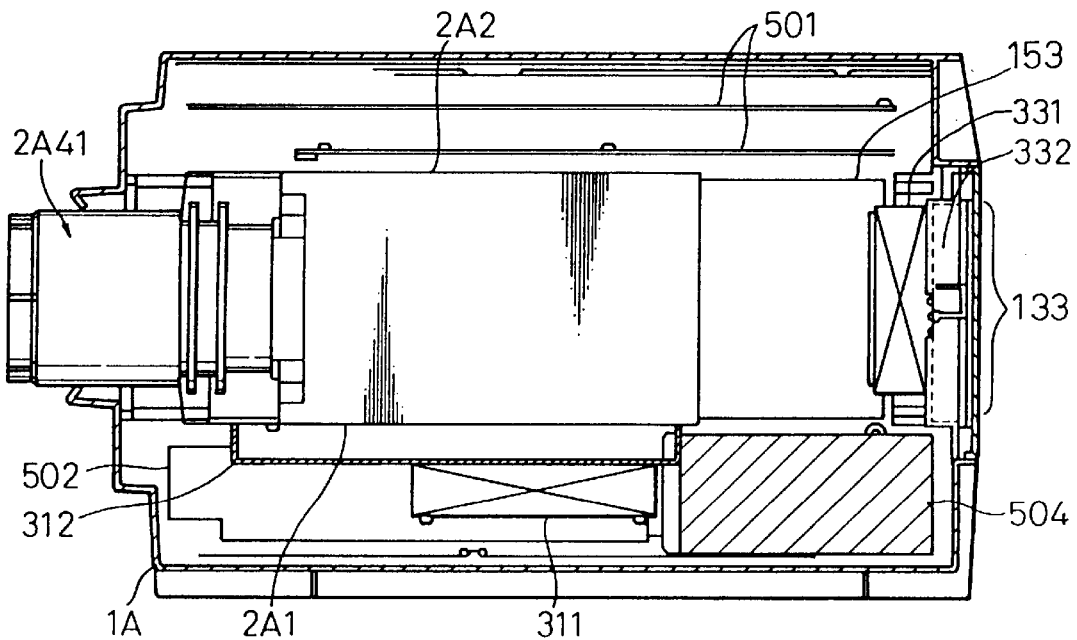
FIGS. 31(a) and 31(b) are an upper sectional view and a sectional side view of the liquid crystal projector shown in FIG. 30 accommodated in a mold case.
Figure 31B:
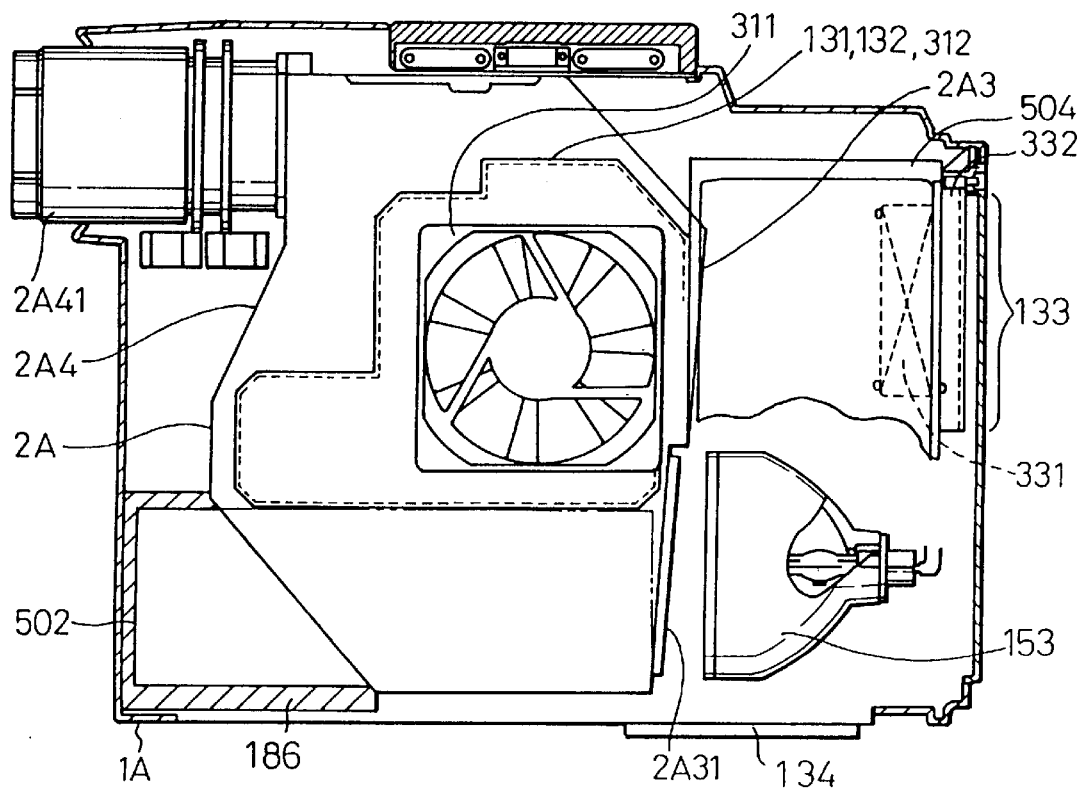

These members are accommodated in the molded case 1A made of resin which functions as an enclosing wall as illustrated in FIGS. 31(a) and 31(b). The optical unit case 2A and molded case 1A are joined or engaged with each other only at the ceiling portion, bottom portion and projection lens 2A41 portion arranged at a front upper position. Right and left portions except for the portion described above are the member accommodating space 1B and accommodates a group of members 1C.

The member accommodating space 1B accommodates the group of members 1C including: a printed board 501 onto which an electric circuit for driving the liquid crystal panels 402, 403, 404 is assembled; a printed board 502 onto which an electric circuit for supplying electric power to the apparatus is assembled; a light source 153; a printed board 504 onto which an electric circuit for turning on the light source 153 is assembled; a suction fan 311 for cooling; and a speaker 186.

As illustrated in FIG. 31(a), there are provided two pieces of printed boards 501 onto which electric circuits for driving are assembled. The printed boards 501 are arranged in the member accommodating space 1B on the right of the apparatus along the wall surface portion 2A2 on which the ventilating hole 132 of the optical unit case 2A is provided, wherein the printed boards 501 are separated from the wall surface portion 2A2 by a predetermined distance. The printed boards 501 must be arranged close to the liquid crystal panel and the dimensions are large, that is, the dimensions of one printed board are 250×350 mm. Accordingly, in order to reduce the dimensions of the apparatus, it is most appropriate to install the printed board at the position described above. The allowable upper limit of temperature in operation is 60° C., and the power consumption is not more than 10 W.

The printed board 502 onto which an electric circuit for supplying DC power to the apparatus is assembled is arranged in the member accommodating space 1B on the left of the apparatus at a position under the ventilating hole 131 of the optical unit case 2A along the wall surface portion 2A1, wherein the printed board 502 is separate from the wall surface portion 2A1 by a predetermined distance. Although the area is 120×240 mm, the thickness is large that it is 40 mm, and the electric power consumption is also large, that is, approximately 30 W. It is required that the allowable upper limit temperature in operation is 60° C. Therefore, a considerably amount of cooling air is required.

The printed board 504 onto which the power circuit used for the light source is assembled is arranged on the left of the light source 153 at the rear of the printed board 502 onto which the power circuit is assembled. The area is 120×210 mm, and the thickness is 40 mm. It is necessary to arrange the printed board 504 at a position close to the light source 153 which is heated to a high temperature and a large amount of heat is generated, and further the power consumption is approximately 50 W, which is large. However, the allowable upper limit temperature in operation is 70° C., which is low.

The suction fan 311 for cooling is attached onto the wall portion 2A1 of the optical unit case 2A through the wind guide 312. The depth of the air guide 312 is approximately 20 mm. The width of the optical unit case 2A is approximately the same as that of the liquid crystal panels 402, 403, 404 including the attaching jig. Therefore, in order to reduce the pressure loss sufficiently, the suction fan 311 is located at a distance, from the liquid crystal panels 402, 403, 404, of about 20 mm. From the same reason, the suction port of the suction fan 311 is distant from the ventilating hole 130 of the mold case shown in FIG. 32(a) by about 40 mm.

The exhaust fan 331 is engaged with the ventilating hole 133 on the rear wall of the mold case 1A shown in FIG. 32(b) through the air guide 332. The depth of the air guide 332 is approximately 20 mm. In order to reduce the pressure loss sufficiently, the exhaust fan 331 is distant from the rear mold portion by about 20 mm. The speaker 186 is located immediately below the projection lens 2A41 at the lowermost portion in the front portion of the apparatus.

Figure 33A:
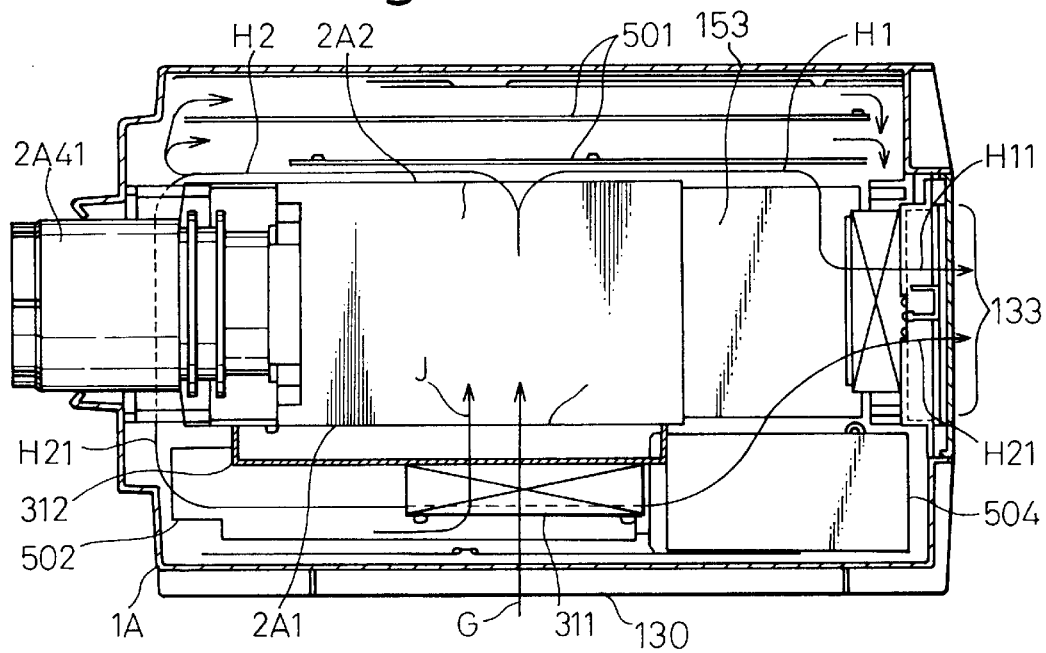
FIGS. 33(a) and 33(b) are an upper sectional view and a sectional side view showing an air flow used for cooling of the liquid crystal projector shown in FIG. 31.
Figure 33B:
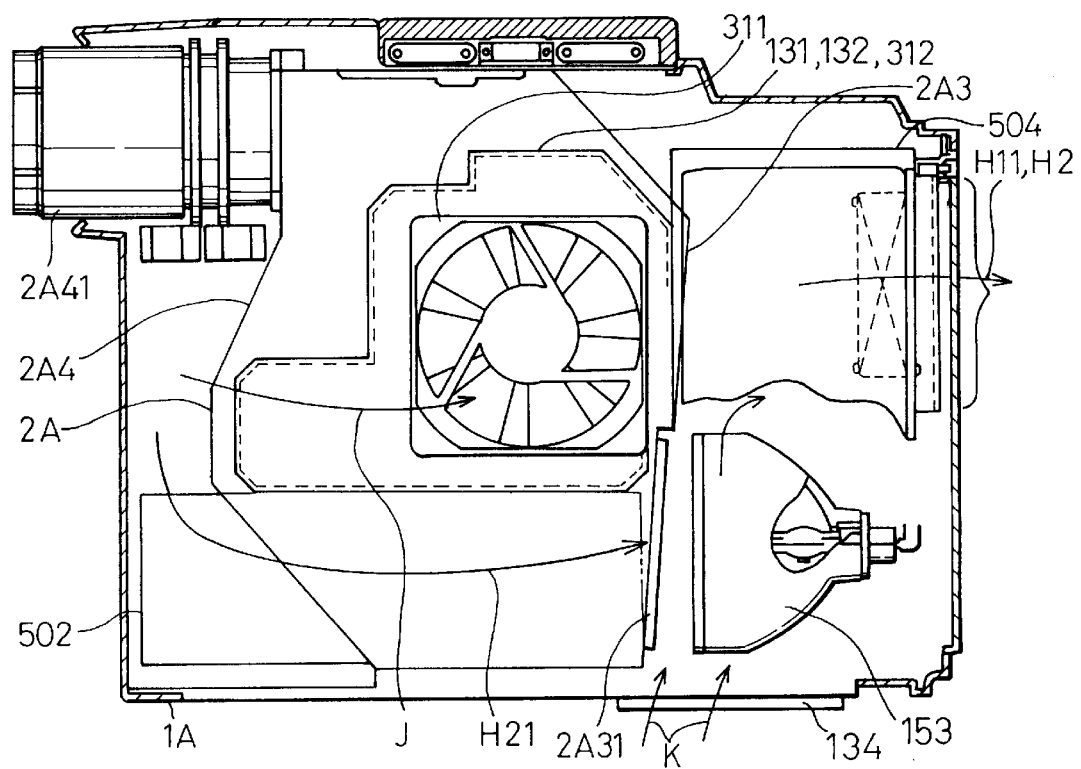

The flow of air flows for cooling in the examples shown in FIGS. 30 to 32 is shown in FIGS. 33(a) and 33(b). In the drawings, the air flow G introduced through the ventilating hole 130 with low resistance enters the inside of the optical unit case 2A and cools the separate liquid crystal panels effectively. After the air flow has passed through the liquid crystal panels, it enters the member accommodating space 2B through the ventilating hole 132 and collides with the printed board 501. While the air flow cools the printed board 501, it is guided and scattered.

A portion of the scattered air flow forms a current H11 which flows backward. The current H11 flows in a small gap of 6 mm between the printed board 501 and the light source 153 so that both can be thermally insulated, and heat of the light source housing is conveyed to the ventilating hole 133 provided at the rear of the mold case 1A.

Most of the air flow scattered by the printed board 501 becomes a current H2 which flows forward. At the fore end of the printed board 501, a portion of the current flows around the printed board 501, so that a current flowing backward is formed. This current cools the parts provided on the printed board 501, and the heat from the parts is conveyed on the rear ventilating hole 133. Most of the residual air flow becomes a detour current H21 which flows between the optical unit case 2A and the mold case 1A and between the projection lens 2A41 and the speaker.

A portion of the detour current H21 is sucked by the suction fan 311 again and becomes a circulating current J following into the optical unit case 2A. Most of the residual detour air successively cools the printed boards 502 and 504, and heat of these printed boards is conveyed to the ventilating hole 133.

When an air filter attached to the ventilating hole 130 formed on the mold case 1A clogs with dust or the ventilating hole 130 is blocked by some reasons given from the outside of the apparatus, the air flow G does not flow into the optical unit case 2A. Even in this case, the circulating current J flows into the optical unit case 2A. Accordingly, it is possible to protect the liquid crystal panels 402, 403, 404 and the polarizing plates arranged on both sides of the liquid crystal panels.

Since the amount of heat generated by the light source 153 is 250 W, which is very large, as illustrated in FIGS. 33(a) and 33(b) the ventilating hole 134, different from the ventilating hole 130 provided on the mold case 1A, is provided in a bottom portion of the mold case 1A, so that the inside of the concave mirror 182 of the light source 153 and the back of the concave mirror are cooled by a air flow flowing through the ventilating hole 134, and heat is conveyed to the ventilating hole 133. In this way, the passages for the air flows K and L are provided which are exclusively used for cooling the light source.

Figure 34A:
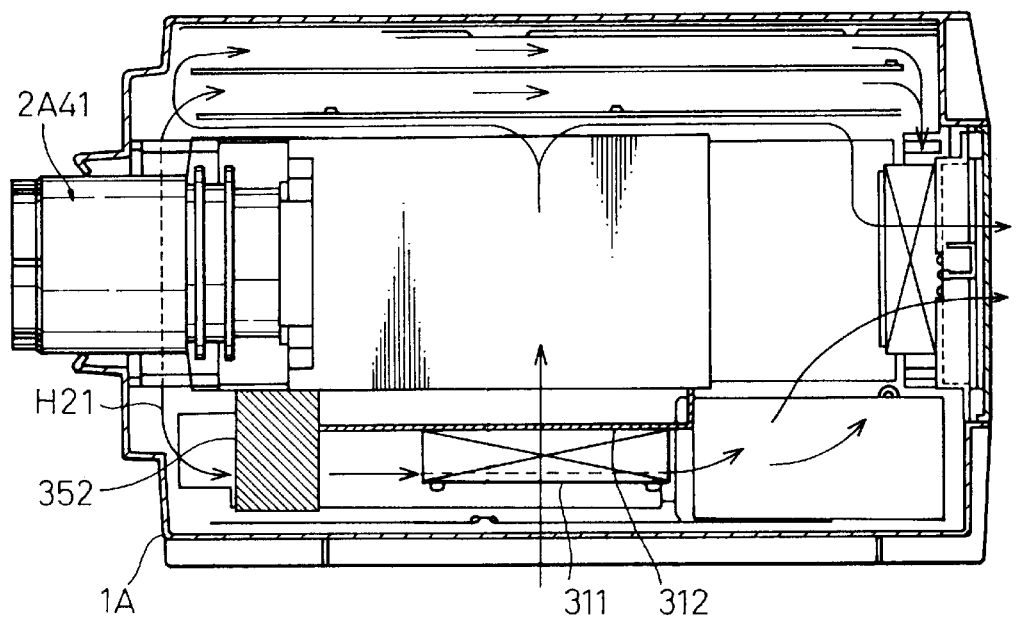
FIGS. 34(a) and 34(b) are views showing variations of the apparatus corresponding to the apparatuses shown in FIGS. 33(a) and 33(b), respectively.
Figure 34B:
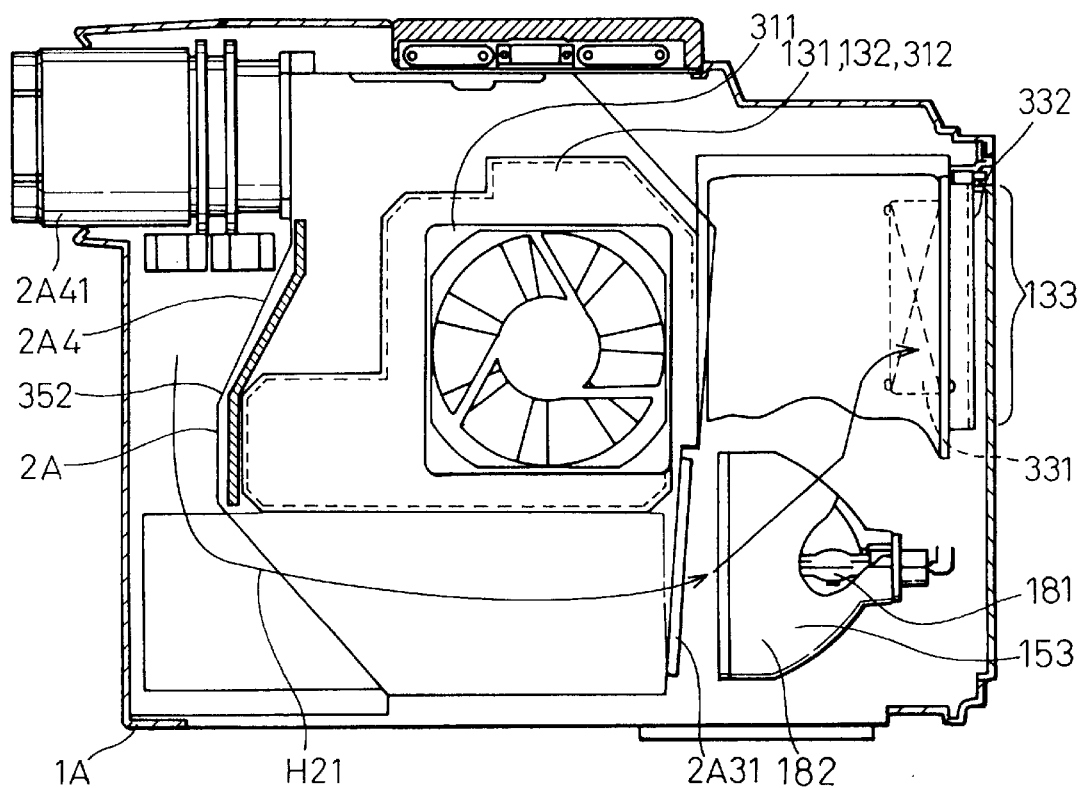

FIGS. 34(a) and 34(b) are views showing a variation of the above example. Since the passage of an air flow is reduced by the wind guide 312 protruding onto the mold case 1A side and the suction fan 311, most of the air flow flows onto the printed board 502. However, as illustrated in FIGS. 34(a) and 34(b), when a wind guide 352 is arranged on the left of the projection lens 2A41 being joined with a front portion of the optical unit case 2A, it is possible to send a larger amount of wind onto the printed board 502. That is, the result of the investigation is as follows. Under the condition that the suction fan 311 and the exhaust fan 331 were driven in a predetermined manner, when the wind guide 352 was not arranged, the wind speed was 2 to 3 m/sec at the center of the printed board 502, however, when the wind guide 352 was arranged, the wind speed was increased to not less than 4 m/sec.

Figure 35A:
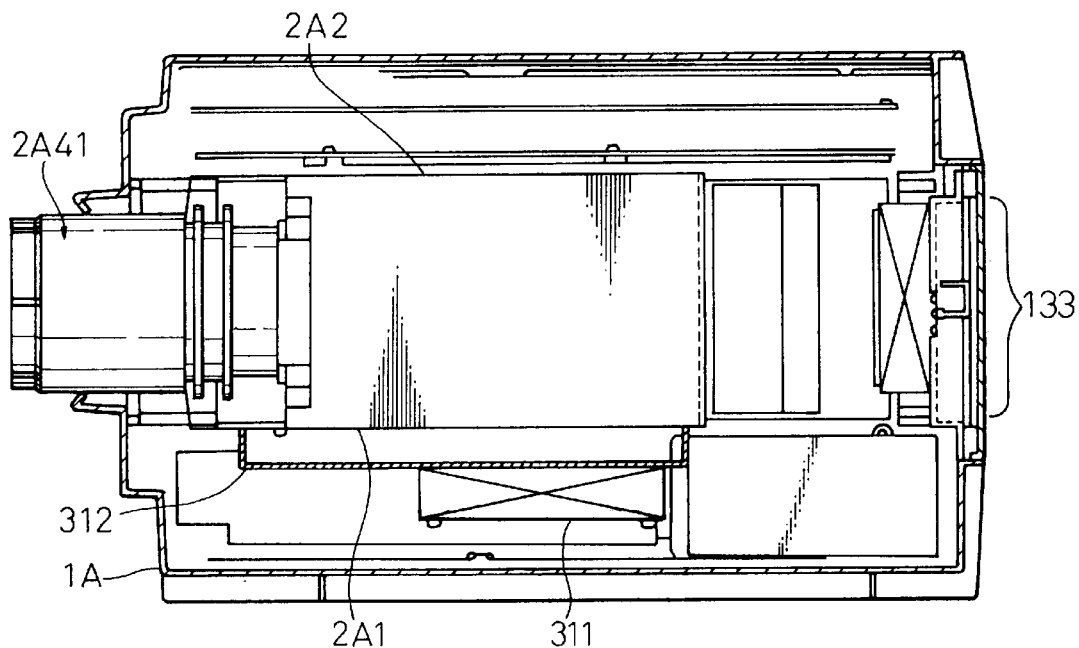
FIGS. 35(a) and 35(b) are views showing other variations of the apparatus corresponding to the apparatuses shown in FIGS. 33(a) and 33(b), respectively.
Figure 35B:
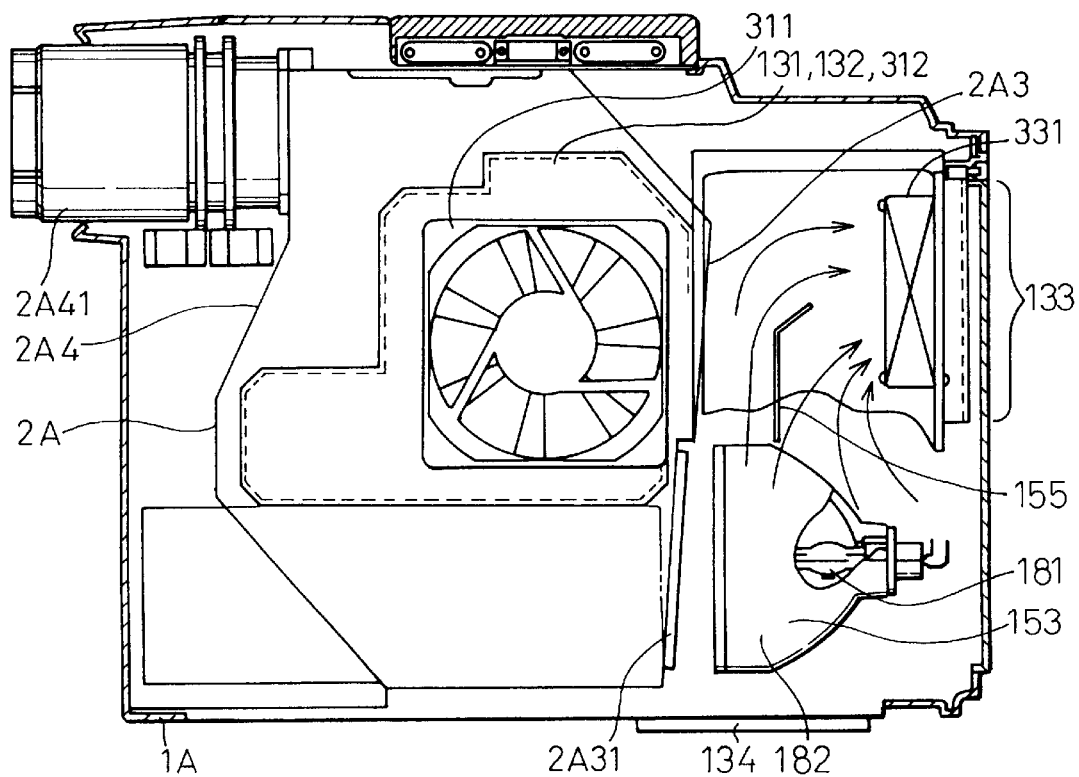

FIGS. 35(a) and 34(b) are views showing another variation of the above example. In this example, a wind guide 155 is arranged at an upper position of the light source 153. A wind to convey the heat generated in the concave mirror 182 to the ventilating hole 133 flows in a space on the side of the optical unit case 2A adjacent to the wind guide 155, and a wind to convey the heat generated at the rear of the concave mirror to the ventilating hole 133 flows in a space on the side of the mold case 1A adjacent to the wind guide 155. When the noise and electric power consumption of the fan were reduced so that the suction fan 311 and exhaust fan 331 were driven under a predetermined driving condition, in the case where the wind guide 155 was not arranged, a hot wind concentrated in a lower portion of the exhaust fan 331, and the hot wind is agitated by the exhaust fan 331, so that only the temperature of a left lower portion of the ventilating hole 133 was raised to a value higher than the room temperature by not less than 50° C. When consideration was given to a case in which the apparatus was used at the room temperature of 30° C., the temperature of the mold case was raised to a value not less than 80° C. Accordingly, when an operator touches the apparatus by chance, he was in danger. However, when the wind guide 155 was arranged in this example, an increase in the mold temperature was suppressed to not more than 30° C.

As described above, according to the present invention, even when a large number of members, in which the allowable temperatures, amounts of generated heat and dimensions are greatly different, are arranged in the apparatus with a high charging efficiency, the apparatus can be effectively cooled while the noise and electric power consumption are maintained low. Therefore, it is possible to realize a compact optical apparatus. According to the present invention, the following apparatus was realized. A small and light liquid crystal projector was realized in which the width was 250 mm, the depth was 445 mm, the height was 300 mm and the total weight was 12 kg. In this case, electric power of the light source was 250 W, and the total power consumption was 350 W which was large. Even in the above liquid crystal projector, while the projector was being driven, the noise level was maintained to be approximately 36 db, the temperature of the external portion of the mold was maintained at 57° C. when the room temperature was 30° C., and the screen illuminance was, 1000 lux.

We claim:

1. An optical apparatus having an optical axis, said apparatus comprising:

a light source composed of a concave mirror and a light emitting section arranged in said concave mirror along the optical axis;

a cooling structure for cooling the periphery of said light emitting section, said cooling structure including a means for generating an air flow having a directivity to a concave portion of said concave mirror at a position close to said light emitting section, wherein said cooling structure including said means for generating an air flow includes a ventilating hole arranged close to said light emitting section;

a region of high temperature and low pressure accommodating said light source; and a region of low temperature and high pressure accommodating optical parts, wherein said two regions are adjacent to each other through a wall and said ventilating hole of the cooling structure is formed on said wall.

2. The optical apparatus according to claim 1, wherein said wall includes a transparent body, and a partiality of said ventilating holes are arranged on said wall around said transparent body.

3. The optical apparatus according to claim 1, wherein said region of low temperature and high pressure includes a suction means for introducing air from the outside of the apparatus into said region of low temperature and high pressure and said region of high temperature and low pressure includes an exhausting means for exhausting air from said region of high temperature and low pressure to the outside of the apparatus.

4. The optical apparatus according to claim 1, wherein said wall includes at least two ventilating holes arranged at an upper and a lower positions, wherein, under the condition that when said optical apparatus is inverted between up and down, the lower ventilating hole is always open and the upper ventilating hole is always closed, so that an air current is circulated from the lower side to the upper side with respect to said concave mirror.

5. The optical apparatus according to claim 1, further comprising a wind guide means for guiding an air flow which flows from the region of low temperature and high pressure to the region of high temperature and low pressure through the ventilating hole so that the air flow can flow along said wall on the side of the region of high temperature and low pressure.

6. A method of cooling an optical apparatus comprising a concave mirror and a light emitting section arranged in said concave mirror along an optical axis of the mirror, said method comprising a step of:

supplying a directional air flow inclined with respect to a plane including the optical axis of the concave mirror and flowing to a concave portion of the concave mirror, so that said directional air flow reaches the most inner portion of the concave mirror, wherein said directional air flow collides with a concave surface of said concave mirror and is scattered by or reflected on the concave surface so that said directional air flow generally avoids colliding directly with the light emitting section before being scattered or reflected.

7. The method of cooling an optical apparatus according to claim 6, wherein there are provided a plurality of directional air flows and they are symmetrical to each other with respect to the optical axis of the concave mirror.

8. A method of cooling an optical apparatus comprising a concave mirror and a light emitting section arranged in said concave mirror along an optical axis of the mirror, said method comprising a step of:

supplying a directional air flow flowing to a concave portion of the concave mirror, so that the air flow reaches the most inner portion of the concave mirror, wherein an air flow, the flow direction of which is approximately perpendicular to the optical axis of the concave mirror, is further supplied, and said supplied air flow and said directional air flow directed to the concave portion of the concave mirror are made to collide with each other so that the direction of said directional air flow directed to the concave portion of the concave mirror is changed and a circulating current is supplied into the concave portion of the concave mirror.

9. A method of cooling an optical apparatus comprising a concave mirror and a light emitting section arranged in said concave mirror along an optical axis of the mirror, said method comprising a step of:

supplying a directional air flow flowing to a concave portion of the concave mirror, so that the air flow reaches the most inner portion of the concave mirror;

said directional air flow directed to the concave portion of said concave mirror is formed when said air flow collides with a concave surface of said concave mirror and is scattered by or reflected on the concave surface so that said directional air flow can evade colliding with the light emitting section, wherein there are provided a plurality of directional air flows and they are symmetrical to each other with respect to one plane including the optical axis of concave mirror.

10. The method of cooling an optical apparatus according to claim 9, wherein there are provided not less than four directional air flows and they are symmetrical to each other with respect to two planes which meet at right angles on the optical axis of the concave mirror.

11. An optical apparatus having a cooling structure comprising:

an inside enclosing wall restricting an inside member accommodating space;

an outside enclosing wall located outside of the inside enclosing wall, the outside enclosing wall restricting an outside member accommodating space formed between the inside and outside enclosing walls;

an optical member accommodated in the inside member accommodating space, said optical member including at least an optical pretreatment system, a spatial modulation element by which rays of light processed by the optical pretreatment system are subjected to spatial modulation, and an after-treatment system by which rays of spatially modulated light are processed;

a heat generating member accommodated in the outside member accommodating space, said heat generating member including at least a printed board on which an electric drive circuit for driving the spatial modulation element is mounted, and a light source;

a cooling mechanism for cooling these groups of members, the inside enclosing wall including a first and a second wall surfaces opposed to each other, first and second ventilating holes being respectively provided on the first and second wall surfaces, a suction member being provided for introducing air from the outside of the outside enclosing wall into the inside member accommodating space through the first ventilating hole;

the outside enclosing wall including a third ventilating hole, and an exhaust member being provided in the third ventilating hole for exhausting air from the outside member accommodating space to the outside of the outside enclosing wall.

12. The apparatus according to claim 11, wherein at least the spatial modulation element is provided between the first and second ventilating holes in a direction approximately perpendicular to the first and second wall surfaces.

13. The apparatus according to claim 11, wherein a first baseboard onto which electric circuit members are assembled is arranged on the outside of the second wall surface having the second ventilating hole so that said first baseboard is in contact with or separated from the outside of the second wall surface, a second baseboard onto which the electric circuit members are assembled is arranged on the outside of the first wall surface so that the second baseboard can not overlap with the first ventilating hole and second baseboard is in contact with or separate from the outside of the first wall surface, wherein an air flow flowing out from the second ventilating hole passes between the first baseboard and the second wall surfaces and makes a detour around the outside member accommodating space and flows to the second baseboard located on the side of the first wall surface and further flows to the light source, and then the air flow is directed to the third ventilating hole.

14. The apparatus according to claim 13, wherein the third baseboard onto which the electric circuit for lighting up the light source is assembled is arranged in the outside member accommodating space close to the third ventilating hole.

15. The apparatus according to claim 14, wherein a fourth ventilating hole is provided on the outside enclosing wall on the opposite side to the third ventilating hole with respect to the light source, the air flow flowing from the outside of the outside enclosing wall into the outside member accommodating space through the fourth ventilating hole is applied at least to the light source and the third baseboard onto which the electric circuit for lighting up the light source is assembled and then the air flow is directed to the third ventilating hole.

16. An optical projector comprising: a light source; an optical unit including a liquid crystal panel; an actuating member for driving said light source or said optical unit; and a cooling mechanism; said projector further comprising:

an inside enclosing wall restricting an inside member accommodating space;

an outside enclosing wall located outside of the inside enclosing wall, the outside enclosing wall restricting an outside member accommodating space formed between the inside and outside enclosing walls;

said liquid crystal panel being accommodated in said inside member accommodating space, and said light source and said actuating member being accommodated in said outside member accommodating space;

said cooling mechanism comprising: first and second ventilating holes provided on said inside enclosing wall; a third ventilating hole provided on said outside enclosing wall; and a forced air cooling means conveying the air taken from the outside of the outside enclosing wall to said inside member accommodating space through the first ventilating hole, said forced air cooling means conveying the air from said inside member accommodating space to said outside member accommodating space through the second ventilating hole, said forced air cooling means conveying the air from said outside member accommodating space to the outside of said outside enclosing wall through the third ventilating hole.

17. An optical projector having a cooling structure comprising:

an inside enclosing wall restricting an inside member accommodating space;

an outside enclosing wall located outside of the inside enclosing wall, the outside enclosing wall restricting an outside member accommodating space formed between the inside and outside enclosing walls;

an optical member accommodated in the inside member accommodating space, said optical member including at least an optical pretreatment system, a spatial modulation element by which rays of light processed by the optical pretreatment system are subjected to spatial modulation, and an after-treatment system by which rays of spatially modulated light are processed;

a heat generating member accommodated in the outside member accommodating space, said heat generating member including at least a printed board on which an electric drive circuit for driving the spatial modulation element is mounted, and a light source;

a cooling mechanism for cooling these groups of members, the inside enclosing wall including a first and a second wall surfaces opposed to each other, first and second ventilating holes being respectively provided on the first and second wall surfaces, a suction member being provided for introducing air from the outside of the outside enclosing wall into the inside member accommodating space through the first ventilating hole;

the outside enclosing wall including a third ventilating hole, and an exhaust member being provided in the third ventilating hole for exhausting air from the outside member accommodating space to the outside of the outside enclosing wail;

said light source having an optical axis and comprising a concave mirror and a light emitting section arranged in said concave mirror along the optical axis, and said cooling mechanism including means for cooling the periphery of said light emitting section, and means for generating an air flow having a directivity to a concave portion of said concave mirror at a position close to said light emitting section.

18. A member accommodating apparatus having a cooling structure comprising:

an inside enclosing wall restricting an inside member accommodating space;

an outside enclosing wall located outside of said inside enclosing wall, said outside enclosing wall restricting an outside member accommodating space formed between said inside and outside enclosing walls;

groups of members accommodated in said inside and outside member accommodating spaces; and a cooling mechanism for cooling said groups of members;

said cooling mechanism comprising:

first and second ventilating holes provided on said inside enclosing wall;

a third ventilating hole provided on said outside enclosing wall; and a forced air cooling means conveying the air taken from the outside of said outside enclosing wall to said inside member accommodating space through said first ventilating hole;

said forced air cooling means conveying the air from said inside member accommodating space to said outside member accommodating space through said second ventilating hole, said forced air cooling means conveying the air from said outside member accommodating space to the outside of said outside enclosing wall through said third ventilating hole;

whereby a portion of air flowing from said second ventilating hole into said outside member accommodating space is discharged from said third ventilating hole to the outside of said outside enclosing wall approximately in a passage of the shortest distance, and the other portion of air flowing from said second ventilating hole into said outside member accommodating space or all residual air makes a detour so that it passes through a longer passage than the above passage, and the air is discharged outside of the enclosing wall through said third ventilating hole.

19. A member accommodating apparatus having a cooling structure comprising:

an inside enclosing wall restricting an inside member accommodating space;

an outside enclosing wall located outside of said inside enclosing wall, said outside enclosing wall restricting an outside member accommodating space formed between said inside and outside enclosing walls;

groups of members accommodated in said inside and outside member accommodating spaces; and a cooling mechanism for cooling said groups of members;

said cooling mechanism comprising:

first and second ventilating holes provided on said inside enclosing wall;

a third ventilating hole provided on said outside enclosing wall; and a forced air cooling means conveying the air taken from the outside of said outside enclosing wall to said inside member accommodating space through said first ventilating hole;

said forced air cooling means conveying the air from said inside member accommodating space to said outside member accommodating space through said second ventilating hole, said forced air cooling means conveying the air from said outside member accommodating space to the outside of said outside enclosing wall through said third ventilating hole;

whereby a portion of air flowing through said first ventilating hole, said inside member accommodating space, said second ventilating hole and said outside member accommodating space circulates back through said outside member accommodating space, passes through said first ventilating hole again and flows into said inside member accommodating space.

20. A member accommodating apparatus having a cooling structure comprising:

an inside enclosing wall restricting an inside member accommodating space;

an outside enclosing wall located outside of said inside enclosing wall, said outside enclosing wall restricting an outside member accommodating space formed between said inside and outside enclosing walls;

groups of members accommodated in said inside and outside member accommodating spaces; and a cooling mechanism for cooling said groups of members;

said cooling mechanism comprising:

first and second ventilating holes provided on said inside enclosing wall;

a suction member engaged with said first ventilating hole directly or through a wind guide means under the condition that said suction member protrudes onto the side of said outside member accommodating space;

a third ventilating hole provided on said outside enclosing wall;

a forced air cooling means conveying the air taken from the outside of said outside enclosing wall to said inside member accommodating space through said first ventilating hole; and a fourth ventilating hole provided in a portion of said outside enclosing wall approximately opposed to said first ventilating hole, said fourth ventilating hole and said suction member being separated from each other, and a portion of all of the air flow that has flowed from the outside of said outside enclosing wall through said fourth ventilating hole being made to flow into said inside member accommodating space through said first ventilating hole;

said forced air cooling means conveying the air from said inside member accommodating space through said first ventilating hole, said forced air cooling means conveying the air from said inside member accommodating space to said outside member accommodating space to the outside of said outside enclosing wall through said third ventilating hole.

21. A member accommodating apparatus having a cooling structure comprising:

an inside enclosing wall restricting an inside member accommodating space;

an outside enclosing wall located outside of said inside enclosing wall, said outside enclosing wall restricting an outside member accommodating space formed between said inside and outside enclosing walls;

groups of members accommodated in said inside and outside member accommodating spaces; and a cooling mechanism for cooling said groups of members;

said cooling mechanism comprising:

first and second ventilating holes provided on said inside enclosing wall;

a third ventilating hole provided on said outside enclosing wall; and a forced air cooling means conveying the air taken from the outside of said outside enclosing wall to said inside member accommodating space through said first ventilating hole;

said forced air cooling means conveying the air from said inside member accommodating space to said outside member accommodating space through said second ventilating hole, said forced air cooling means conveying the air from said outside member accommodating space to the outside of said outside enclosing wall through said third ventilating hole;

wherein a total amount of generated heat by the group of members accommodated in the outside member accommodating space is greater than the heat generated by the group of members accommodated in the inside member accommodating space, and a total amount of generated heat in the outside member accommodating space is greater than that generated in the inside member accommodating space.

22. A member accommodating apparatus having a cooling structure comprising:

an inside enclosing wall restricting an inside member accommodating space;

an outside enclosing wall located outside of said inside enclosing wall, said outside enclosing wall restricting an outside member accommodating space formed between said inside and outside enclosing walls;

groups of members accommodated in said inside and outside member accommodating spaces; and a cooling mechanism for cooling said groups of members; said cooling mechanism comprising:

first and second ventilating holes provided on said inside enclosing wall;

a third ventilating hole provided on said outside enclosing wall; and a forced air cooling means conveying the air taken from the outside of said outside enclosing wall to said inside member accommodating space through said first ventilating hole;

said forced air cooling means conveying the air from said inside member accommodating space to said outside member accommodating space through said second ventilating hole, said forced air cooling means conveying the air from said outside member accommodating space to the outside of said outside enclosing wall through said third ventilating hole;

wherein an allowable upper limit (in) temperature in operation of the group of members accommodated in the outside member accommodating space is higher than that of the group of members accommodated in the inside member accommodating space.

23. The apparatus according to claim 18, wherein a total amount of generated heat by the group of members accommodated in the outside member accommodating space is greater than the heat generated by the group of members accommodated in the inside member accommodating space, and a total amount of generated heat in the outside member accommodating space is greater than that generated in the inside member accommodating space.

24. The apparatus according to claim 18, wherein an allowable upper limit (in) temperature in operation of the group of members accommodated in the outside member accommodating space is higher than that of the group of members accommodated in the inside member accommodating space.

25. The apparatus according to claim 19, wherein a total amount of generated heat by the group of members accommodated in the outside member accommodating space is greater than the heat generated by the group of members accommodated in the inside member accommodating space, and a total amount of generated heat in the outside member accommodating space is greater than that generated in the inside member accommodating space.

26. The apparatus according to claim 19, wherein an allowable upper limit (in) temperature in operation of the group of members accommodated in the outside member accommodating space is higher than that of the group of members accommodated in the inside member accommodating space.

27. The apparatus according to claim 20, wherein a total amount of generated heat by the group of members accommodated in the outside member accommodating space is greater than the heat generated by the group of members accommodated in the inside member accommodating space, and a total amount of generated heat in the outside member accommodating space is greater than that generated in the inside member accommodating space.

28. The apparatus according to claim 20, wherein an allowable upper limit (in) temperature in operation of the group of members accommodated in the outside member accommodating space is higher than that of the group of members accommodated in the inside member accommodating space.

* * * * *